US010084771B2

(12) United States Patent
Kocher et al.

(10) Patent No.: US 10,084,771 B2
(45) Date of Patent: Sep. 25, 2018

(54) SECURE FEATURE AND KEY MANAGEMENT IN INTEGRATED CIRCUITS

(71) Applicant: Cryptography Research, Inc., Sunnyvale, CA (US)

(72) Inventors: Paul Carl Kocher, San Francisco, CA (US); Benjamin Che-Ming Jun, Burlingame, CA (US); Andrew John Leiserson, San Francisco, CA (US)

(73) Assignee: Cryptography Research, Inc., Sunnyvale, CA (US)

( * ) Notice: Subject to any disclaimer, the term of this patent is extended or adjusted under 35 U.S.C. 154(b) by 115 days.

(21) Appl. No.: 14/871,951

(22) Filed: Sep. 30, 2015

(65) Prior Publication Data
US 2016/0028722 A1    Jan. 28, 2016

Related U.S. Application Data

(63) Continuation of application No. 13/831,545, filed on Mar. 14, 2013.
(Continued)

(51) Int. Cl.
*H04L 29/06* (2006.01)
*H04L 9/08* (2006.01)
(Continued)

(52) U.S. Cl.
CPC .......... *H04L 63/0823* (2013.01); *G06F 21/54* (2013.01); *G06F 21/71* (2013.01);
(Continued)

(58) Field of Classification Search
CPC ...... G06F 12/1408; G06F 21/73; G06F 21/57; G06F 21/572; G06F 21/575; G06F 21/606; H04L 63/0823; H04L 63/064; H04L 63/062; H04L 9/3247; H04L 9/0825; H04L 9/3234
See application file for complete search history.

(56) References Cited

U.S. PATENT DOCUMENTS 5,530,749 A    6/1996 Easter et al.
7,795,899 B1   9/2010 Grohoski et al.
(Continued)

FOREIGN PATENT DOCUMENTS

EP    1722503 A1    5/2005
EP    0872080 B1    12/2010
(Continued)

OTHER PUBLICATIONS

Extended European Search Report dated Apr. 19, 2016 re EP Appln. No. 13827130.9. 8 Pages.
(Continued)

*Primary Examiner* — Tae K Kim
(74) *Attorney, Agent, or Firm* — Lowenstein Sandler LLP

(57) ABSTRACT

A mechanism for providing secure feature and key management in integrated circuits is described. An example method includes receiving, by a root authority system, data identifying a command that affects operation of an integrated circuit, singing, by the root authority system, the command using a root authority key to create a root signed block (RSB), and providing the RSB to a security manager of the integrated circuit.

15 Claims, 20 Drawing Sheets

Related U.S. Application Data

(60) Provisional application No. 61/682,001, filed on Aug. 10, 2012.

(51) Int. Cl.
*H04L 9/32* (2006.01)
*G06F 21/54* (2013.01)
*G06F 21/71* (2013.01)
*H04L 9/14* (2006.01)

(52) U.S. Cl.
CPC ............ *H04L 9/083* (2013.01); *H04L 9/0897* (2013.01); *H04L 9/14* (2013.01); *H04L 9/3247* (2013.01); *H04L 63/061* (2013.01); *H04L 63/083* (2013.01); *G06F 2221/2101* (2013.01)

(56) References Cited

U.S. PATENT DOCUMENTS

| | | | | |
|---|---|---|---|---|
| 8,812,837 | B2 * | 8/2014 | McCanna | H04L 9/3268 455/411 |
| 8,843,764 | B2 | 9/2014 | Hussain | |
| 8,954,732 | B1 * | 2/2015 | Watsen | H04L 9/3263 713/157 |
| 9,015,837 | B1 * | 4/2015 | De Los Reyes | G06F 17/40 717/168 |
| 9,736,144 | B2 * | 8/2017 | McCanna | H04L 63/0823 |
| 9,754,115 | B2 * | 9/2017 | Bodis | G06F 21/602 |
| 2002/0141582 | A1 | 10/2002 | Kocher et al. | |
| 2002/0144125 | A1 | 10/2002 | Watanabe et al. | |
| 2003/0037246 | A1 * | 2/2003 | Goodman | G06F 21/572 713/191 |
| 2004/0103325 | A1 | 5/2004 | Priebatsch | |
| 2004/0133794 | A1 | 7/2004 | Kocher et al. | |
| 2005/0152545 | A1 | 7/2005 | Desmicht et al. | |
| 2006/0080631 | A1 | 4/2006 | Koo | |
| 2006/0187857 | A1 | 8/2006 | Imai et al. | |
| 2007/0230445 | A1 | 10/2007 | Barrie et al. | |
| 2008/0037781 | A1 | 2/2008 | Kocher et al. | |
| 2008/0162866 | A1 | 7/2008 | Siddiqi et al. | |
| 2008/0304425 | A1 | 12/2008 | Karaoguz | |
| 2009/0187771 | A1 * | 7/2009 | McLellan, Jr. | H04L 9/0891 713/193 |
| 2009/0222655 | A1 | 9/2009 | Martinet et al. | |
| 2010/0161966 | A1 | 6/2010 | Kwon et al. | |
| 2010/0199077 | A1 * | 8/2010 | Case | G06F 11/3656 713/1 |
| 2010/0241858 | A1 | 9/2010 | Koo et al. | |
| 2010/0250936 | A1 | 9/2010 | Kusakawa et al. | |
| 2010/0262819 | A1 | 10/2010 | Yang et al. | |
| 2010/0269156 | A1 | 10/2010 | Hohlfeld | |
| 2011/0102317 | A1 | 5/2011 | Katsukura et al. | |
| 2011/0141791 | A1 | 6/2011 | Ahmed | |
| 2012/0017271 | A1 | 1/2012 | Smith et al. | |
| 2012/0102334 | A1 | 4/2012 | O'Loughlin et al. | |
| 2012/0155639 | A1 | 6/2012 | Oney et al. | |
| 2012/0192293 | A1 | 7/2012 | Adkins et al. | |
| 2013/0326214 | A1 * | 12/2013 | McCanna | H04L 9/3268 713/156 |

FOREIGN PATENT DOCUMENTS

| | | |
|---|---|---|
| JP | 10-274927 A1 | 10/1998 |
| JP | 2002-244865 A | 8/2002 |
| JP | 2003-209545 A1 | 7/2003 |
| WO | WO-1996-039765 A1 | 12/1996 |
| WO | WO-2011-003199 A1 | 1/2011 |

OTHER PUBLICATIONS

CN Office Action With Search Report with dated Jan. 26, 2017 re: CN Appln. No. 201380042381.3. 32 pages. (With Translation) .
EP Response With dated Oct. 28, 2016 re: EP Appln. No. 13827130,9 to the Extended European Search Report dated Apr. 19, 2016 and the Communication Pursuant to Rules 70(2) and 70a(2) EPC dated May 9, 2016. 21 Pages.
TW Office Action with dated Jan. 13, 2017 re: TW Appln. No. 102123695. 17 Pages. (With Translation).
PCT International Search Report and Written Opinion dated Mar. 7, 2014 in International Application No. PCT/US13/54306. 15 pages.
CN Office Action with dated Sep. 22, 2017 re: CN Appln. No. 201380042381.3. 7 Pages. (With Translation).
JP Office Action With dated Aug. 22, 2017 re: JP Appln. No. 2015-526731. 16 Pages. (With Translation).
Communication pursuant to Article 94(3) EPC, dated Mar. 27, 2018, for European application No. 13 827 130.9-1218.
Japanese Decision of Refusal, dated Mar. 27, 2018, for application No. 2015-526731, English translation attached.

* cited by examiner

| | | 285 |
|---|---|---|
| 290 | 295 | |
| 0 | Enable GPS |
| 1 | Enable Wi-Fi |
| 2 | Enable Bluetooth |
| 3...10 | PLL configuration (8 bits) |
| ⋮ | ⋮ |
| n | Nth Value |

Figure 2B

SECURE FEATURE AND KEY MANAGEMENT IN INTEGRATED CIRCUITS

RELATED APPLICATION

This application claims the benefit of U.S. Provisional Patent Application No. 61/682,001, filed Aug. 10, 2012 and U.S. Non-Provisional patent application Ser. No. 13/831,545, filed Mar. 14, 2013, both of which are hereby incorporated by reference herein.

BACKGROUND

Presently, system-on-a-chip vendors may sell many different varieties of the same chip, where each variety is configured for a particular application. Chip configuration often occurs by blowing one or more fuses or otherwise programming a one-time programmable memory on the chip. This type of chip configuration is generally a one-way process and cannot be undone. One method of circumventing the permanence of the configuration process is to add redundant or spare bits within the one-time programmable memory that can be combined to modify a previous setting (e.g., by exclusive-ORing multiple bits together to produce the final configuration setting). This type of redundancy has limited flexibility, however, and requires additional fuses which take up additional real estate on the chip. In addition, having multiple fuses behind a setting does not remove the need to perform multiple programming steps to configure chips adds cost. Likewise, configurations today continue to be performed by chip vendors (or their contractors), who then maintain inventories of chips with multiple fuse configurations.

The stockpiling of the different varieties of the same chip is often inefficient. For example, stockpiled chips configured for a particular application are potentially wasted if they were overproduced or if customers' chip configuration needs change. Additionally, in some cases order fulfillment can be delayed if inventory of the configured chips is insufficient to meet the demand. Moreover, the present model of configuration by the chip vendor can limit the range of business relationships and revenue streams practical between chip vendors and downstream customers. For example, the present model may limit the ability to generate future revenue from reconfiguration of chips after their initial sale. If a downstream customer wishes to obtain features beyond the configured feature set, current chips typically lack means for unlocking this functionality and there is therefore no opportunity to use downstream feature enablement as a revenue stream.

Moreover, the need for secure systems and applications is growing. Presently, allegedly secure chips are often programmed with security keys on the factory floor. Secure keys may be used in a variety of ways, such as, for example, to protect stored data, control access to digital content, or encrypt/authenticate data used in transactions. Today, these keys can be stored in a one-time programmable memory, which may hold keys directly or hold a base key that is used with cryptographic functions that derivative keys for various functions. Typically, security is provided by performing the key loading process in a secured facility.

BRIEF DESCRIPTION OF THE DRAWINGS

Reference will now be made to the accompanying drawings showing example embodiments of the present application, and in which:

FIG. 2B is a block diagram of an exemplary embodiment of a feature space associated with a Security-Manager-enabled IC.

DESCRIPTION OF EXAMPLE EMBODIMENTS

Reference will now be made in detail to the present exemplary embodiments illustrated in the accompanying drawings.

1. Concepts

1.1. Ecosystem Overview

Figure 1A:
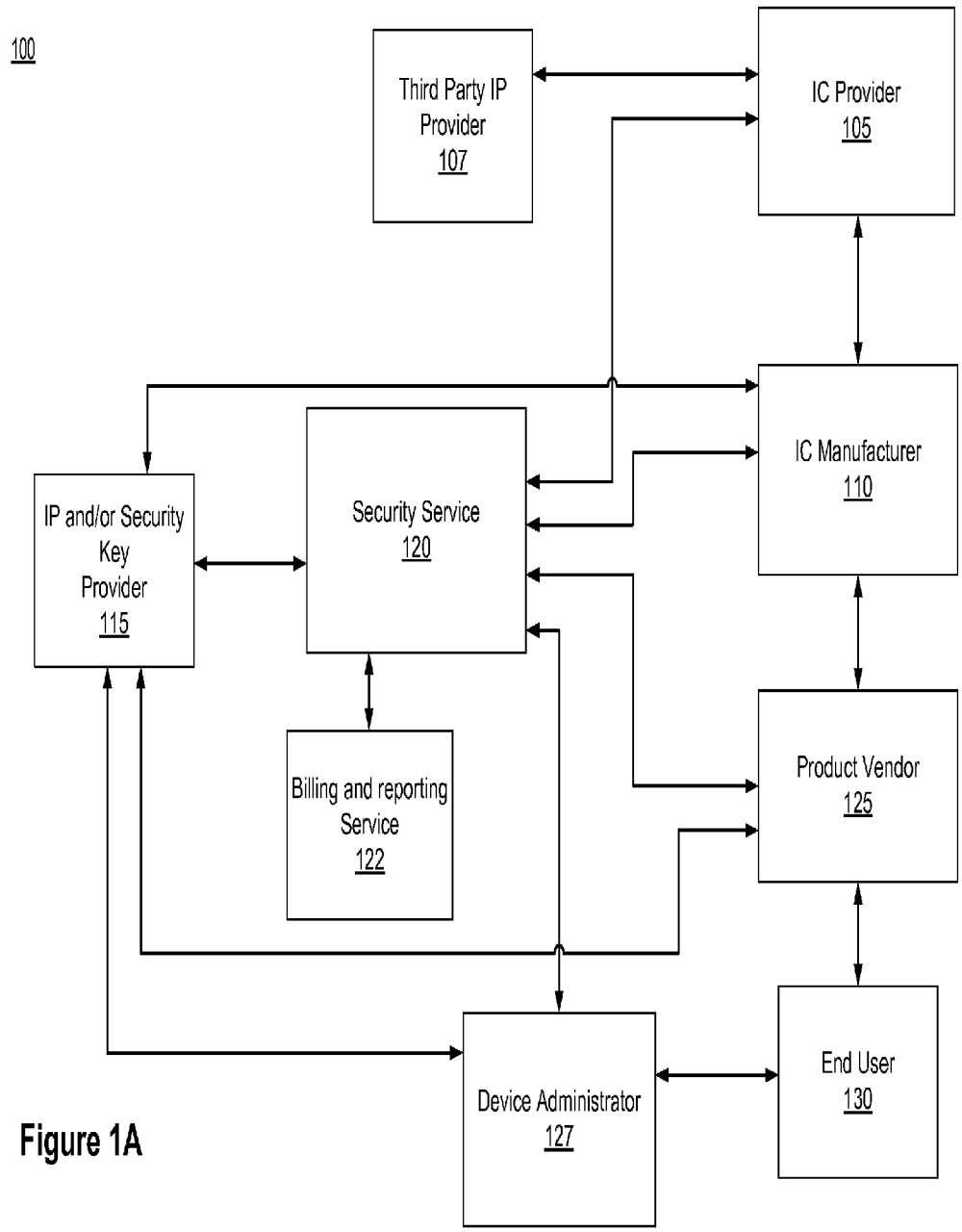
FIG. 1A is a block diagram depicting an exemplary ecosystem.

Reference is now made to FIG. 1A, which shows, in block diagram form, an exemplary ecosystem 100. As shown in FIG. 1A, system 100 may include an integrated circuit ("IC") provider 105, a third party IP provider 107, an IC manufacturer 110, an IP and/or security key provider 115, a security service 120, a billing and reporting service 122, a product vendor 125, a device administrator 127, and an end user 130. For simplicity, in this exemplary ecosystem, only one of each entity is shown. In practice, an ecosystem consistent with the principles described herein may have one or more of each entity (i.e. multiple IC manufacturers supplying identical ICs, multiple product vendors providing products that utilize the same IC design, and multiple customers). Some steps shown in FIG. 1A may also involve several companies (e.g. IC fabrication may involve different companies and/or stages to manufacture wafers, perform initial testing, cut wafers, package chips, etc.). Additionally, in some instances, some entities and their functions could be contained within a single entity. For example, some companies both design and manufacture ICs, in which case IC manufacturer 110 and IC provider 105 could be the same entity IC provider 105 is an entity which provides chip designs to IC manufacturer 110 for chip production. Specifically, IC provider 105 provides chip designs for configurable ICs, such that some aspects of the chip may be configured (e.g., for specific applications or to enable/disable particular features) after manufacture. For example, IC provider 105 can include in the design a security manager ("SM") core, or can specify that the manufactured IC includes an SM core. An IC including an SM core is referred to as a SM-enabled IC. Among other things, the SM core allows one or more configurable features ("Features") of the IC to be locked or unlocked (or otherwise configured, e.g., such as tuning a PLL to adjust a CPU's performance or delivering a secret key for use by the Feature) depending on the desired configuration and security needs. An SM-enabled IC includes, for example, one (or possibly more) SM cores, and one (or more) secure persistent memories. And as discussed in detail below, the SM-enabled IC optionally may include some other elements (e.g., one or more extractors, one or more Features, etc.), or some combination thereof. IC provider 105 can include a root-public key as a portion of the mask provided to IC manufacturer 110. IC provider 105 may obtain the root-public key from security service 120 who may act as a root authority.

The root authority is an entity that is associated with a root-authority system that manages SM programming capabilities, and can assign subsets of capabilities to one or more delegate-authority systems associated with one or more delegate authorities. As discussed in more detail below, the root-authority system may control configuration of an SM-enabled IC. Configuration of an SM-enabled IC may include, for example, performing Feature management of the SM-enabled IC, performing key management of the SM-enabled IC, or a combination thereof. The root-authority system may control Feature management of the SM-enabled ICs possessed by other entities in system 100. For example, the root-authority system may directly create cryptographically-verifiable (e.g., digitally signed) commands to lock, unlock, or configure Features associated with the SM-enabled ICs. Additionally, the root-authority system may create a limited authorization that allows configuration changes to SM-enabled ICs to be created by IC manufacturer 110, product vendor 125, device administrator 127, end-user 130, other entities, or some combination thereof.

The root-authority system may also control key management for the SM-enabled ICs. For example, the root-authority system may authorize the SM core to securely deliver payloads (e.g., secret keys, or other values) to other parts of the SM-enabled IC (including to software executing on the SM-enabled IC). The root-authority system may authorize one or more delegate-authority systems to securely deliver payloads.

As noted above, the root authority is an entity associated with the root authority system. Accordingly, while embodiments described herein may refer to security service 120 as the root authority, it is contemplated that other entities may act as the root authority. For example, IC provider 105, product vendor 125, or some other entity.

The previous paragraphs describe the root authority granting permissions to another entity. The recipient of these permissions is referred to as a delegate authority. In some instances a delegate authority is associated with a delegate-authority system that has been given a subset of the root-authority system's SM programming capabilities. The subset of SM programming capabilities may differ between delegate-authority systems. The delegate authority may be product vendor 125, IC manufacturer 110, device administrator 127, some other entity, or some combination thereof.

As discussed in detail below, the root-authority system, one or more delegate authority systems or some combination thereof, may have some (or full) control over modification (e.g., Feature and key management operations) of the SM-enabled ICs in system 100.

IC manufacturer 110 is an entity that manufactures ICs. As discussed above, some ICs are configurable, such that the chip may be configured for specific applications after manufacture. Systems on a chip ("SOC"), application specific integrated circuits (ASICs), FPGAs, mobile radio chips, and processors (e.g. CPUs), are examples of ICs suitable for use with embodiments described herein. In general, feature management is most particularly appropriate for chips that integrate multiple functions that can be used independently, or that have functions that are configurable, or have capabilities that should be enabled/disabled at different stages in the chip lifecycles (e.g., such as debug/test modes). And for key management applications, any chip that utilizes cryptographic keys or similar secrets may be a good candidate. IC manufacturer 110 may manufacture ICs that include an SM core. IC manufacturer 110 may embed one or more security keys, a device ID, initial Feature configuration settings, or some combination thereof, into the SM core as part of its manufacturing process, testing process, or both. To do this, IC manufacturer 110 is equipped to provide a first stage of customization which is discussed in detail below. Specifically, IC manufacturer 110 may be a delegate authority such that it is able to make specific configuration changes to SM-enabled ICs. For example, in an IC that contains multiple processors, IC manufacturer 110 may be allowed to set the number of processors usable in the SM-enabled IC, but not the clock rate for each processor. In some embodiments not shown, IC manufacturer 110 and IC provider 105 are the same entity.

Additionally, IC manufacturer 110 may conduct testing on the manufactured ICs to ensure they are operating within design specification. In some cases, testing processes such as wafer sort may be performed at a different facility and/or by a different company than IC fabrication, in which case the label "IC manufacturer 110" represents the combination of these roles/steps. IC manufacturer 110 provides the SM-enabled ICs to product vendor 125.

Product vendor 125 incorporates the SM-enabled ICs into one or more products (e.g., SM-enabled devices) which are then made available to end user 130. In some embodiments, product vendor 125 is a device or service retailer and makes the SM-enabled devices directly available to end user 130. In other embodiments, product vendor 125 distributes the SM-enabled devices to one or more third party device or service retailers (not shown) for distribution to end user 130.

Product vendor 125 may add additional customization of the SM-enabled ICs. To do this, product vendor 125 may be a delegate authority such that it is able to make certain specific configuration changes to SM-enabled ICs. For example, as a delegate authority, product vendor 125's delegate-authority system may be allowed certain capabilities by the root-authority system.

Even after a product is sold to end user 130, it is also possible to further configure or enable features in a SM-enabled IC. For example, end user 130 and/or the product, may coordinate with product vendor 125, device administrator 127, security service 120, a delegate authority, a root authority, or some combination thereof, to enable Features in a SM-enabled IC. For example, this process may involve transmitting a request over a network (e.g. by using a radio in the product to transmit a request message via a cellular data network) and receiving (e.g., by using a radio in the product to receive a message from a cellular data network) a chip-specific message that authorizes the requested configuration changes.

In some instances product vendor 125 may also act as an application author for one or more applications installed on a SM-enabled device. Additionally, product vendor 125 may acts as an application operator who administers functionality associated with the application. Similarly, product vendor 125 may also act as an operating system vendor, distributing an operating system compatible with the SM-enabled devices. Product vendor 125 may also act as a service operator (such as a mobile network operator), e.g. managing one or more services or capabilities that may be available to the SM-enabled device.

In other embodiments, other entities, one or more third parties (not shown), or some combination thereof, may be the application author, operating system vendor, application operator, or some combination thereof.

IP and/or security key provider 115 manages security keys for use with the SM-enabled IC. The security key values, including public keys and secret keys, may be provided to IC Manufacturer 110, security service 120, product vendor 125, device administrator 127, or some combination thereof. In some embodiments not shown, IP and/or security key provider 115 may also provide security keys to third party IP provider 107, IC provider 105, or some combination thereof.

Security service 120 may act as a central distributor for security keys which may be used by entities in the ecosystem. For example, security service 120 may obtain the security keys from IP and/or security key provider 115 (or from multiple security key providers) and distribute them to other entities in system 100. For example, a SM-enabled mobile telephone applications processor may be programmed with keys from a plurality of IP and/or security key providers 115, including many that operate independently and/or are not tied to a specific IC provider 105. Examples of such IP and/or security key providers 115 include without limitation electronic payment systems, DRM/anti-piracy systems, identity systems, etc. In some embodiments, security service 120 may include a root-authority system and acts as the root authority for the SM-enabled IC. In other embodiments the aggregation and root authority roles may be separate. As a root authority, security service 120 may authorize one or more other entities in system 100 to be delegate authorities, to for example, lock or unlock certain Features associated with SM-enabled ICs, securely deliver keys to parts of the SM-enabled IC (or to software executing on the SM-enabled IC) etc. As discussed in detail below, a delegate authority is authorized to make certain configuration changes to the SM-enabled ICs, subject to the privileges cryptographically granted by the root authority.

Billing and reporting service 122 may couple to some or all of the other entities within system 100. In some cases one or more entities in system 100 may wish to charge a fee for certain configuration settings to the SM-enabled ICs (e.g., to enable a value-added feature). Billing and reporting service 122 tracks fees associated with various transaction types by various entities in the ecosystem. For example, an entity may be required to pay to enable or disable Features associated with the SM-enabled IC(s) or deliver a key to the SM-enabled IC(s). Billing and reporting service 122 collects information about the number of transactions performed by delegates, for example by receiving electronic transaction or audit records from delegate-authority systems. Based on the collected records, billing and reporting service 122 may aggregate billing amounts across multiple chip types and transaction types (e.g., kinds of features enabled), and ultimately calculate the amounts owed by entities that enable features or perform other transactions. Likewise, as described below, billing and reporting service 122 can help calculate amounts owed to third parties such as third party IP providers 107. Inputs to the billing calculations by billing and reporting service 122 can include, without limitation, the number of transactions performed, what Features were enabled, the length of time the Features were enabled, etc. In some embodiments, the root authority or delegate authority may impose a policy that payment is received prior to enabling or configuring a Feature on the SM-enabled IC, but in other cases billing and payment may be performed after enablement. In either case, security service 120 can, via its communications with a root-authority system and one or more delegate-authority systems, dynamically adjust limits on the number of transactions performed. In some embodiments, billing and reporting service 122 is part of security service 120. In other embodiments, billing and reporting service 122 may perform only transaction tracking, and billing and the financial processes may be performed separately (or even manually).

System 100 may include a third party IP provider 107 (or, as noted previously, several third party IP providers 107). A third party IP provider 107 may provide one or more Features or parts of Features to IC provider 105 for integration into the SM-enabled IC. Or in some instances, third party IP provider 107 may simply license IC provider 105 to use one or more existing Features or parts of Features. The integrated Feature may be enabled by the root authority or a delegate authority operating within its delegated capabilities. In some embodiments, the Feature is not enabled (e.g., unlocked) until third party IP provider 107 is compensated for the use of the IP block. For example, as discussed in the context of billing and reporting service 122, a delegate authority system may not be provided with the ability or authorization to authorize Feature activation until payment is received by billing and reporting service 122 and/or by third party IP provider 107.

End user 130 is an entity who uses the product (e.g., device containing the SM-enabled IC). End user 130 may, for example, purchase the SM-enabled device from IC Manufacturer 110, product vendor 125, device administrator 127, or some third party device or service retailer.

In some embodiments, system 100 includes device administrator 127. Device administrator 127 may be a delegate authority such that it is able to make specific configuration changes to SM-enabled ICs. End user 130 may then coordinate with device administrator 127 (or security service 120, etc.) to enable Features in a SM-enabled IC. This process may include the user and/or the device transmitting a request over a network, receiving an authorization response, and providing at least a portion of the response message (which portion may, for example, include both a digital signature from the root authority system in security service 120 that authorizes a delegate authority, and a digital signature from device administrator 127 acting as the delegate authority) to the SM-enabled IC to actually enable the requested feature. The request may include a payment, a confirmation that a payment has been made, or a commitment to make a future payment. Additionally, in some embodiments, device administrator 127 may be a device or service retailer with some direct or indirect control over modification (e.g., feature and key management operations) of the SM-enabled ICs in system 100.

Additionally, in some embodiments not shown, system 100 may include a device feature administrator or a device key administrator. The device feature administrator may be a delegate authority with certain limited abilities to authorize configuration changes (e.g., via key management operations, feature management operations, or some combination thereof) involving the SM-enabled ICs).

Additionally, in some embodiments the root authority may securely allow other entities in system 100 to enable or partially enable one or more Features of a SM-enabled IC or SM-enabled device for testing. For example, the root authority, via the root-authority system, may enable (or partially enable) a Feature in the SM-enabled IC for a set period of time or for a number of power-ups (e.g., such that the Feature is only enabled until the next time the SM-enabled IC is powered up or reset). Similarly, in some embodiments, the delegate, via the delegate-authority system, if permitted by the root authority, may also be allowed to enable or partially enable Features of the SM-enabled IC or device for testing.

One or more of the above entities may be coupled to each other via one or more networks operated by one or more communication network operators. Some of these networks may be maintained by one or more network administrators.

Figure 1B:
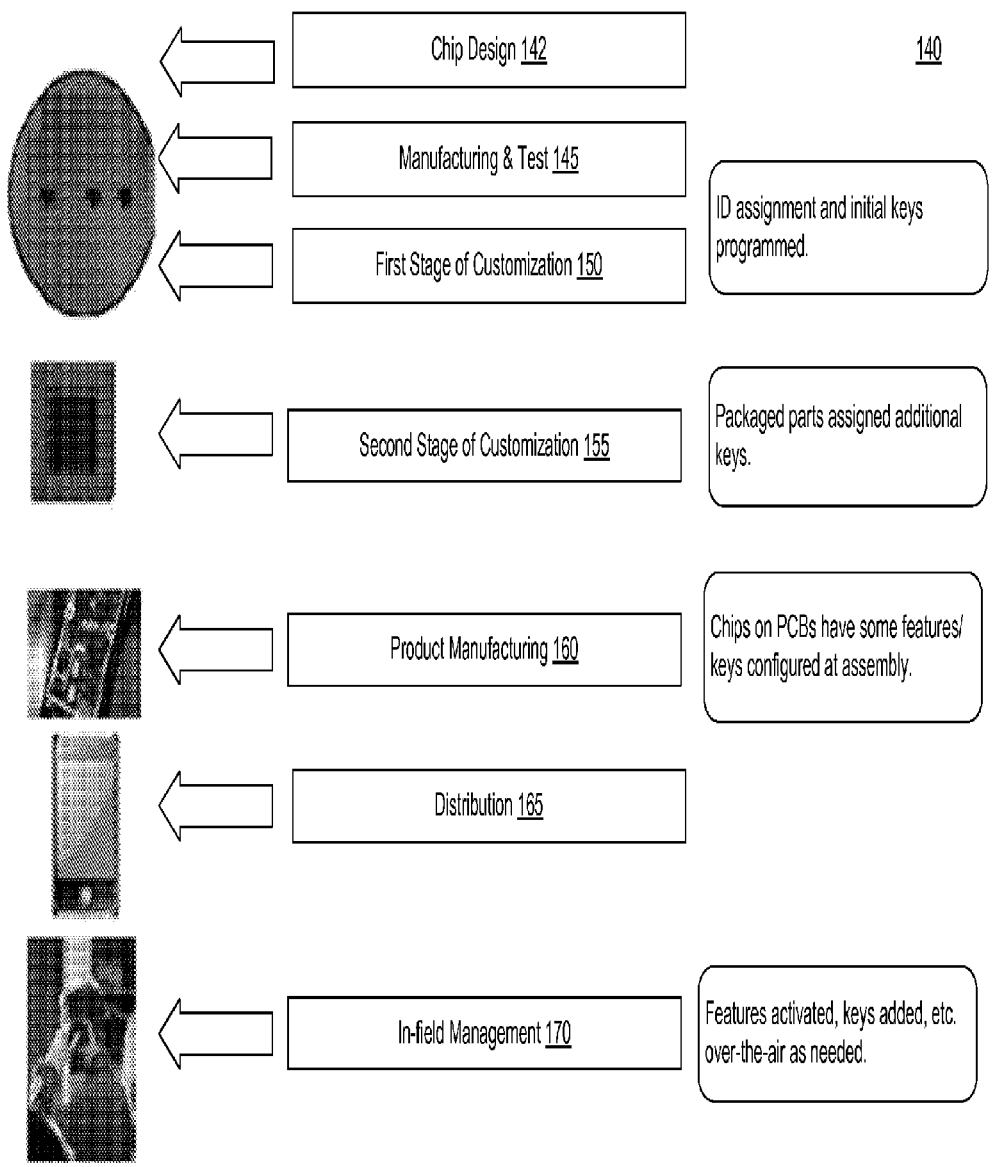
FIG. 1B is a flowchart which shows an exemplary lifecycle for a Security-Manager-enabled device within an ecosystem.

Reference is now made to FIG. 1B, which shows an exemplary lifecycle 140 for a SM-enabled device within an ecosystem (e.g., system 100). While the lifecycle discloses the following steps in a particular order, it is appreciated that at least some of the steps can be moved, modified, or deleted where appropriate.

In step 142, a SM-enabled IC is designed. As discussed in detail below, the design process may utilize, for example, a configurator, a netlist received from the SM vendor, and a means to generate hardware configuration keys and constants. For example, this generation process may involve the root authority system, e.g. in some embodiments the root authority system can generate a key pair for a public key cryptosystem, where the public key is exported as a hardware configuration key and the private key is retained in the root authority system (e.g., for authorizing delegates). The SM-enabled IC design may include one or more security keys that may be hardwired into the manufactured SM-enabled IC. The SM-enabled IC design may be configured to allow storage for one or more security keys that can be programmed into the manufactured SM-enabled IC (e.g., in steps 150, 155, or both).

In step 145, a SM-enabled IC is manufactured and tested based on the SM-enabled IC design. Each SM-enabled IC may have one or more SM cores, where each SM core may control one or more Features. As discussed in detail below, the Features may be altered, enabled, disabled, or some combination thereof, as authorized by one or more security keys, via one or more SM commands, or some combination thereof. Additionally, in some embodiments, Features or parts of Features from third party providers (e.g., third party provider 107) may be incorporated into the SM-enabled IC. For example, a third party provider may provide a Feature used for rendering large image files at high speeds, but is not initially enabled. Testing may be conducted to confirm whether Features of the SM-enabled IC are operating correctly. For example, a delegate authority if permitted by the root authority (or the root authority itself) may temporarily (e.g., for a fixed time and/or until the chip is reset) enable one or more Features to facilitate testing. Depending on the embodiment, step 145 may be performed by IC manufacturer 110, IC provider 105, some other entity (e.g., a specialized testing facility), or some combination thereof.

In step 150, a first stage of customization occurs. In this step the SM-enabled IC may be assigned a device identifier ("ID") and configured with one or more keys from a root-authority system, a delegate-authority system, one or more keysplits, or base keys.

A keysplit is part of a key that, when combined with a different keysplit, forms a complete key (e.g., a base key). Keysplits may be used to increase security of the base keys, for example, by having the SM core in the SM-enabled IC programmed with different keysplits by different parties, none of which have knowledge of all the different keysplits. The combination of the keysplits, via a combining function, occurs within the SM core to provide the base key. Because none of the programming parties knows all the keysplits a compromise of a single facility does not necessarily compromise the base key.

An exemplary configuration process is discussed in more detail below. Other parameters may also be set during the first stage of customization. For example, if the SM-enabled IC contains multiple processors, the first stage of customization may set the number of processors that may be initially used by product vendor 125. Or, for example, the first stage of customization may set a maximum clock rate for each processor to inhibit overheating of under load or to match maximum rates determined during testing 145. For example, storing such limits securely can prevent dishonest distributors from fraudulently remarking lower-speed parts as a higher speed grade. In alternate embodiments not shown, there is no step 150, and instead the first stage of customization is performed as part of step 155.

In step 155, a second stage of customization occurs. For example, the same series of SM-enabled ICs may be further configured to meet the requirements for different product vendors. In many instances, some product vendors may want SM-enabled ICs to be specially configured. During this stage of customization, the feature state of the SM core may be updated to customize the SM-enabled IC to each product vendor's needs. Updating the feature state may include disabling, enabling, or altering one or more Features associated with the SM-enabled IC, as well as loading additional keys, or some combination thereof. This second stage of customization may be performed, for example, by IC manufacturer 110, IC provider 105, product vendor 125, some other entity, or some combination thereof. Although cost concerns typically favor keeping the number of customization steps as small as possible, some applications may employ more or less than two stages of customization. Note that the two stages of customization (150 and 160) can, for example, be performed respectively at wafer-level test and package-level test of the IC.

In step 160, the SM-enabled IC is incorporated into a device to create a SM-enabled device during a product manufacturing process. The feature state of the SM-enabled IC may updated at this point as well. For example, a product vendor may enable combinations of Features to create different product lines of SM-enabled devices. This programming process can be secured using a hardware security module issued from security service 120 (e.g., to ensure that accurate records are ultimately provided to billing and reporting service 122). In this way, product vendor 125 may only need to procure and hold in its inventory a single type of chip from IC provider 105, then this chip can be used in multiple products with different configurations that are set during product assembly. The Billing and reporting service 122 serves to ensure that the capabilities being enabled are paid for (e.g. so that the IC provider 105 is able to collect the appropriate amount for each chip depending on the chip's configuration). Keys may also be programmed into the SM core as part of step 160. For example, the product vendor may program a unique key in each SM-enabled device (such as a key known to product vendor 125 but not to IC provider 105).

In step 165, the SM-enabled device is distributed. The SM-enabled device may be distributed, for example, to another product vendor, a reseller, an end user 130, device administrator 127, or other entity in the ecosystem.

In step 170, in-field management of the SM-enabled device can be done. (A SM-enabled device that has left the product vendor is said to be in field. Note this is not necessarily synonymous with being in the hands of an end user, e.g., a mobile phone carrier operator may perform customization or provisioning of a phone before delivering it to end user 130.) In-field management can include a request being received to update the feature state of an SM-enabled device. For example, a request may be received to enable a special audio component of the SM-enabled IC. Such requests may be initiated, for example, by end user 130 or the device itself sending the request to the root authority or an appropriately authorized delegate authority. In-field management then involves transmission of one or more authorizations and/or secure keys to an SM-enabled device. As discussed in detail below, secure key delivery and feature management may be performed by the root authority, via the root-authority system in communication with the SM-enabled device, or by a delegate authority, via a delegate-authority system acting within its delegated SM-programming capabilities and in communication with the SM-enabled device. Upon receipt of the response, software in the SM-enabled device provides portions of the response (including cryptographic authorization from the root authority and/or delegate authority) to the SM core, which verifies that the authorization is valid for the particular device before performing the requested operation (e.g., Feature configuration, keying, etc.).

Any of the previous mentioned entities either acting alone or in conjunction with other entities may request, produce, cache, transmit, or modify the aforementioned update, management, and audit messages to control keys and Features of the SM-enabled device. Each of these entities with roles at various points of the device lifecycle may operate independently, and may have different degrees of ownership of the SM-enabled device or infrastructure interoperating with the device. The deployment of certain keys or features may involve payments, audits, or other business arrangements where the facilitation of SM-core activity, requests to perform certain actions, the process of formulating or interpreting SM-core messages, communicating or storing said messages, authorizing actions, may be performed by one or more of the aforementioned entities.

2. Security Manager System Architecture

Figure 2A:
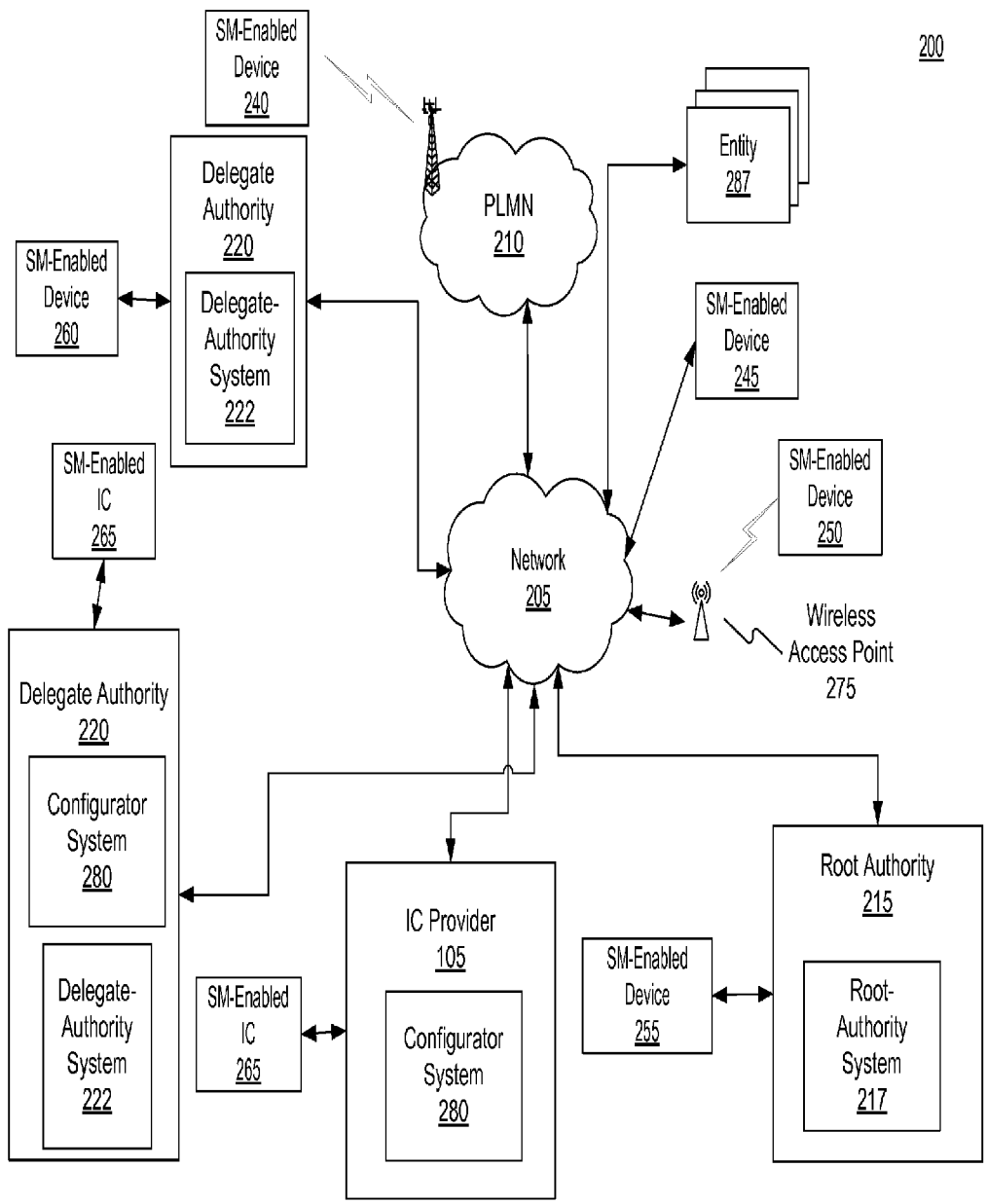
FIG. 2A depicts in block diagram form, an exemplary operational system for configuring and managing one or more devices having Security-Manager-enabled chips.

Reference is now made to FIG. 2A, which shows, in block diagram form, an exemplary operational system 200 for configuring and managing one or more SM-enabled devices. System 200 can include some or all of a public land mobile network (PLMN) 210, a root authority 215, a root-authority system 217, a delegate authority 220, a delegate-authority system 222, an IC provider 105, SM-enabled devices 240, 245, 250, 255, and 260, SM-enabled ICs 265, a wireless access point 275, configurator systems 280, and additional entities 287, operatively connected by network 205.

Network 205 can be, for example, the Internet, an intranet, a local area network, a wide area network, a campus area network, a metropolitan area network, an extranet, a private extranet, any set of two or more coupled electronic devices, or a combination of any of these or other appropriate networks. Network 205 can also communicate with PLMN 210, which is also referred to as a wireless wide area network (WWAN) or, in some cases, a cellular network. For simplicity, network 205 is shown as a single entity, but it is possible that multiple networks may exist. For example, a private extranet may connect IC provider 105 and root authority 215 even if the other entities in FIG. 2A are connected by the Internet.

Root authority 215 is an entity (e.g., security service 120) that manages SM programming capabilities and can assign subsets of capabilities to one or more delegate authorities 220. Root authority 215 is associated with root-authority system 217 that contains (or otherwise has access to) the cryptographic keys that manage the SM-enabled ICs 265 and SM-enabled devices 240, 245, 250, 255, and 260. Root-authority system 217 is configured to generate one or more root-signed blocks ("RSBs"). As discussed in detail below, a RSB can include one or more SM commands, command templates, one or more delegate permissions, one or more keys (e.g., a delegate-public key), or some combination thereof. The RSB contains at least one digital certificate signed by root-authority system 217 using a root-private key (e.g., an RSA private key) that corresponds to a public key in the SM core. Root-authority system 217 may be configured to provide one or more RSBs or other data to configurator system 280, SM-enabled ICs 265, delegate-authority system 222, SM-enabled devices (e.g., 240, 245, 250, 255, or 260), one or more other entities 287, an electronic storage medium (not shown), or some combination thereof. Additionally, root-authority system 217 may be configured to provide the RSB when instructed by a user of root-authority system 217. Root-authority system 217 can be implemented on a single computer, or in some instances may be distributed across a plurality of computers (e.g., which contain key shares for a threshold signature system, where cooperation from multiple key shares is required to compute digital signatures) which may be geographically dispersed.

As discussed in detail below, root-authority system 217 may be configured to delegate privileges to one or more delegate-authority systems 222. Root-authority system 217 also may be configured to generate system and netlist key constants for one or more configurator systems 280. Additionally, root-authority system 217 may be configured to manage master keys which are used during the customization process (discussed below). Root authority system 217 may also be configured to create test vectors and other values to assist with SM core integration and ASIC manufacturing In some embodiments, root-authority system 217 may be configured to delegate the ability to create additional delegates. In this embodiment, a first delegate-authority system may be configured to create one or more second delegate-authority systems each of which have a subset of SM programming capabilities of the first delegate-authority system. The maximum numbers of levels of delegates (if there is a limit) can be a configurable option. A simplified embodiment can omit support in the SM core for delegate authorities, and instead use the root secret key for all tasks (e.g., where entities serving as delegate authorities have signing devices containing the root signing key and/or interact over a network with such a device).

Root-authority system 217 may include a tamper resistant signing module(s) (not shown) to provide added security and/or performance. Delegate-authority system 222 is typically granted authorization by root-authority system 217 to exercise only a subset of the authority of root authority system 217. The privilege stages of the root and delegate authority systems 217 and 222 may be regulated by, for example, cryptographic keys, restrictions enforced by signing software, operator policies, and policies within the tamper resistant signing modules.

System 200 can include multiple delegate authorities 220. Delegate authority 220 is an entity that is associated with delegate-authority system 222. Delegate-authority system 222 has been given a subset of SM programming capabilities by the root-authority system 217. Examples of delegate authority 220 may, for example, include a product vendor 125, IC manufacturer 110, a device administrator 127, a service operator, a retailer, some other entity (e.g., as discussed with reference to FIG. 1A), or some combination thereof.

Delegate-authority system 222 may have certain capabilities (e.g., portions of key management operations, Feature management operations, or a both) delegated to it from root-authority system 217. These capabilities can be conveyed as a set of positive authorizations or as a set of restrictions. For example, privileges may be conveyed and limited by root-authority system 217, delegate-authority system 222, via control over what signed messages (e.g., signed blocks) are provided by authority systems, regulation of the signing key(s) used by the authority systems, regulation of the specific types of payloads that may be signed by one of the authority systems, regulation of the communications channel/destinations and the types of messages that may be conveyed to the SM-core, or some combination thereof. Exemplary privileges that may be delegated include the ability to enable or disable certain hardware capabilities, adjust performance settings or other values, allow use of certain external interfaces, allow use of certain modes of operation, enable or disable test modes (e.g., control diagnostic and debug mode), control over when a particular mode or Feature is active (e.g., only active during the manufacturing process), the ability to adjust the values of certain configuration settings of Features of SM-enabled ICs, derive and/or use one or more key encrypting keys, encrypt keys for use by certain SM-enabled ICs, supply keys to IC subcomponents, adjust configuration of the SM-enabled IC generally, audit state information accessible by the SM core, program keys/keysplits, perform diagnostic activity on an in-field SM-enabled IC, calibrate or tune analog circuits to compensate for process variation, configure a PLL for the input clock and desired operating frequency in a specific product, adjust the power and frequency of a radio(s), configure the limits enforced by an internal thermal failsafe (thermal limits may vary based on the packaging and cooling solution used in different products), configuring a battery charging circuit, etc.

Root authority system's 217 authorization to delegate-authority system 222 can also include restrictions on delegate-authority system 222's authorizations, including without limitation whether delegate-authority system 222 can configure Features persistently (e.g., by directing the SM core to save Feature configuration data in nonvolatile/one-time programmable memory) or volatile, whether authorizations must be bound to a single IC or to a particular class or group of ICs, whether authorizations must be bound to a random number generator state (to prevent authorizations from being reused), As noted previously, Feature settings are not limited to simple binary on/off settings. For example, there may be concerns (e.g., security, reliability, liability, etc.) that make it desirable to use delegate-authority system 222 or root-authority system 217 to require authorization for changes in configuration. For example, misconfiguring the PLL or using incorrect analog calibration may cause the SM-enabled IC to malfunction, so PLL settings can be secured by the SM core.

As discussed in detail below, delegate-authority system 222 is configured to generate one or more delegate-signed blocks ("DSBs"). Delegate-authority system 222 may be configured to provide a DSB to: configurator system 280, SM-enabled ICs 265, root-authority system 217, IC provider 105, SM-enabled devices (e.g., 240, 245, 250, 255, or 260), an electronic storage medium (not shown), one or more entities 287, or some combination thereof. Additionally, delegate-authority system 222 may be configured to provide the DSB when instructed by a user of delegate-authority system 222. The one or more entities 287 are entities who are not a delegate authority or a root authority, but may still receive RSBs, delegate-signed blocks ("DSBs"), or some combination thereof. For example, in some embodiments, device administrator 127, IP and/or security key provider 115, escrow service provider, etc., may not be a delegate authority, but may still receive RSBs, DSBs, or some combination thereof.

Delegate-authority system 222 may include a tamper-resistant signing module (not shown) configured to store one or more of security keys (e.g., delegate private keys, AES keys, or both). For example, the tamper-resistant signing module may be a smartcard or hardware security module ("HSM").

In some embodiments, delegate-authority system 222 has the capability to create additional delegates. In such an embodiment, the system providing SM programming capabilities can be prohibited from delegating more SM programming capabilities than it currently possesses. If, for example, root-authority system 217 provides only SM programming capabilities A, B, and C to delegate-authority system 222 along with the ability to assign SM programming capability to additional delegate-authority systems (not shown), delegate-authority system 222 would not be able to further provide a SM programming capability D, but could delegate A and B without permission C. Delegate-authority system 222 can be implemented on a single computer, or in some instances be distributed across a plurality of computers. Distributed delegates can use threshold signatures as described previously. Delegate authority system 222 may also include multiple redundant and/or clustered components for reliability and performance.

Additionally, in some embodiments, root-authority system 215, delegate-authority system 222, or both, may be configured to store signed blocks (e.g., RSB, DSB) in one or more electronic storage mediums (not shown). The electronic storage mediums may be, for example, be volatile (e.g., SRAM, DRAM, or other semi-conductor memory) or non-volatile (e.g., hard disk, R/W optical disk, flash drive), or some combination thereof. RSBs and/or DSBs may also be stored within SM-devices (e.g. if an RSB/DSB pair only configure a Feature until the device is reset, the configuration may need to be loaded each time the product resets).

System 200 can include a number of SM-enabled devices, for example, SM-enabled devices 240, 245, 250, 255, and 260. SM-enabled devices 240, 245, 250, 255, and 260 can be, for example, smartphones, tablets, netbooks, desktop computers, set top boxes, mobile devices, laptop computers, digital video recorders, pay TV set top boxes, automobiles, manufacturing equipment, digital and video cameras, batteries, devices that authenticate peripherals, video game user interfaces and other user interfaces, etc. Although the exemplary system of FIG. 2A is shown with multiple SM devices, the system may be implemented with one or any number of SM-enabled devices. SM-enabled devices 240, 245, 250, 255, and 260 verify signatures or other authorizations from root-authority system 217, which in turn can authorize, delegate-authority systems 222. Additionally, the coupling between an SM-enabled device (e.g., SM-enabled devices 240, 245, 250, 255, and 260) and root-authority system 217, delegate-authority systems 222, or both, may be temporary. For example, the coupling may exist for the time needed to modify operations of the SM-enabled IC. Authorizations for the SM-enabled device 260 and SM-enabled IC 265 may be created by root-authority system 217 or delegate-authority systems 222, and delivered via one or more device testers (not shown), programming fixtures (not shown), or other intermediates (not shown).

A device tester, in general, is configured to test the functionality of ICs. For SM-enabled ICs in particular, a device tester may additionally be configured to program information (e.g. keys, device ID, etc.) into the SM-enabled ICs (e.g., by supplying programming commands to the SM core). The device tester or programming fixture may also record information in a database about the device and its SM core, including device identifying information and configuration information. Each device tester may be configured to couple one or more SM-enabled devices to a root-authority system, a delegate-authority system, or both. Systems or devices that might have a range of features or capacities are ideally suited for the use of a SM-enabled IC.

A SM-enabled device may include one or more SM-enabled ICs (e.g., 265). Likewise, SM-enabled ICs 265 may include, for example, one or more SM cores, and one or more secure memories. And as discussed in detail below, the SM-enabled IC optionally may include some other elements (e.g., one or more extractors, outputs to control one or more Features, etc.), or some combination thereof. As discussed below, certain modifications may be made to SM-enabled IC 265 via key management or feature management operations.

SM-enabled devices 240, 245, 250, 255, and 260 may be equipped for cellular communication through PLMN 210, be equipped for Wi-Fi communications using wireless access point 275, or be capable of both cellular and Wi-Fi communications using network 210, or any combination thereof. Wireless access point 275 can be configured to WLANs that operate in accordance with one of the IEEE 802.11 specifications. For example, SM-enabled device 250 is coupled wirelessly to network 205 using wireless access point 275, and SM-enabled device 240 is coupled to network 205 via PLMN 210. Examples of other communication interfaces that SM-enabled devices 240, 245, 250, 255, and 260 can support include Ethernet, JTAG, serial/USB, 120, etc.

SM-enabled devices 240, 245, 250, 255, and 260, even if comprising the ICs that were identical prior to programming, may be configured differently. In consumer electronics, similar silicon or IC's (e.g., fabricated from the same mask set) may be used in a wide range of products (for example, both high end and low end products), with the difference in performance controlled at least in part by configuration. A feature rich product might have, for example, advanced audio capabilities (e.g., surround sound), multiple HD video streams, a large number and varied of inputs and outputs, support for multiple cable providers including cable or satellite or wireless specific modems and transcoders, various tuners etc., viewing features such as, picture in a picture, Wi-Fi support etc. Likewise, a SM-enabled IC intended for use in a smartphone may include feature managed support for capabilities such as GPS, various wireless network radio protocols, Wi-Fi, near field communication based financial transactions, BLUETOOTH or other wireless peripheral interface, over the air video services, HD video support, wireless video interfaces, additional external video interfaces, numerous and various resolutions of cameras and sensors, support for various screen sizes and resolutions, processing for haptics, graphics, and video enhancement and acceleration. SM cores in SM-enabled ICs can be used to manage the size and performance of system resources such as, for example, the available or useable memory, or the speed and number of available processors. In some embodiments not shown, a SM-enabled device (e.g., 240, 245, 250, 255, and 260) may also be operatively coupled to configurator system 280. There can be many reasons why a particular Feature should be disabled on a particular chip, including to reduce IP licensing costs for unused features, to disable non-working or untested silicon areas, to avoid cannibalizing sales of higher-end parts, to disable modes/settings that may create security risks, etc.

Delegate authority 220 (e.g., IC provider 105 or IC manufacturer 110) may receive configuration data from configurator system 280. Data generated by configurator system 280 may inform delegate authority 220 how to address specific Features or keys.

In an exemplary embodiment, the SM core feature space is an address space stored in a memory that includes values controlling specific functionality or configuration aspects of an SM-enabled IC. FIG. 2B is a block diagram of an exemplary embodiment of a feature space 285 associated with a SM enabled IC. Feature space 285 includes one or more values 295, each of which has an associated address 290. For example, the value "GPS radio enabled" might be assigned to address 0 in feature space. Other values in the feature address space, such as a multi-bit PLL configuration value, may span multiple bits (and the corresponding addresses).

In some embodiments, one or more of the values in feature space 285 may relate to the SM core itself rather than other Features of the SM-enabled IC. Such feature space values are known as internal features. For example, an internal feature might control whether a certain base key is available for use, carry information about a device (such as the identity of the product manufacturer, the geographical region where the product was sold), etc. These internal features can be used to control authorizations (e.g., so that an authorization intended for devices in one geographical region will not work on devices in another).

Internal features are addressable and are controlled in a manner similar to features used to control device elements. Internal features may be used to represent a higher level privilege or feature condition, which is then mapped to more specific SM core outputs that direct elements of the device. For example, an internal feature may represent a numerical speed grade from 1 to 7, while the SM core outputs include control signals for setting a larger number of PLL clock control settings that map to the speed grade. In this way, as will be described later, the numerical speed grade setting can be used as a condition for forming SM core commands whose operation is limited to specific speed grades. In another example, internal features can be used within the SM core to track an issued group identifier, device identifiers, or the fact that a device has been packaged, manufactured, or sold by a certain identity. In this example, the manufacturing entity could be a delegate authority 220 with the permission to program its manufacturer ID into an internal feature. SM-core commands can interpret the internal features and use the results to control how the SM core manages other features or keys. For example, the SM core may only output certain keys or permit certain debug settings for devices operated by a specific network operator or only for devices in a pre-retail state.

Referring back to FIG. 2A, configurator system 280 may also be configured to map device specific keys to the SM core key interface. Configurator system 280 may be utilized both during and after chip development to manage these settings and configurations.

Configurator system 280 may be configured to receive one or more configurator input files, hardware ("HW") constants, or some combination thereof, and process them to generate one or more extractor hardware definitions, one or more sub-extractor hardware definitions, and an IC configuration map. The generated definitions are, for example, Verilog modules describing components of the SM-enabled IC. The one or more configurator input files may define the particular configuration for a SM-enabled IC, list one or more security keys and their associated destinations on the SM-enabled IC, the names and addresses of Features managed by the SM core, etc. For example the one or more configurator input files may be configured to specify such things as named feature signals, configuration bits, grouping of configuration bits, security key bus outputs, security key bus attributes, secure memory mapping attributes, or some combination thereof. Examples of hardware constants that may be managed by configurator system 280 and embedded in the hardware (e.g., fixed in the silicon and common for all chips made with the same masks) include, for example, a chip product ID, one or more keys from the root authority (e.g., root-authority system public key), one or more keys from a delegate authority, one or more base keys, one or more additional security keys, error correction data, default values for Feature controls, etc.

The generated extractor hardware definition is used in the IC design to route bus outputs from the SM core to the various sub-extractors. Sub-extractor hardware definitions are used in the IC design to map the feature space bits from the extractor to named Features and keys, as specified in the one or more configurator input files. The extractor hardware definition and any sub-extractor hardware definitions are used to produce the SM-enabled IC design containing an extractor and sub-extractors.

Configurator system 280 may also be configured to utilize a state cache that tracks changes in the configuration, and which may be used to minimize modification of the existing circuit design layout. A state cache may be, for example, a map file, an IC configuration map, etc. In some embodiments, instead of utilizing a map file to update the state cache, configurator 280 is configured to re-read a prior output to implement the state cache.

In some embodiments, configurator system 280 may be configured to additionally generate one or more command mapping files, one or more firmware mapping files, and one or more documentation files. Command mapping files are, for example, files used to map commands into a form understandable by an SM-enabled IC. Firmware mapping files are files that contain defines and structures needed for software development (e.g., header and source file, etc.). Documentation files are provide an overview of the SM-enabled IC design. Additionally, documentation files can include environment and construction principles used in design of software components. The documentation files may be in one or more of the following formats: XML, HTML, text, PDF, MICROSOFT WORD, etc Configurator system 280 may be used in the production of one or more SM-enabled ICs 265. In some embodiments, not shown, configurator system 280 can be used in the production of one or more of SM-enabled devices 240, 245, 250, 255, and 260. Configurator system 280 can include one or more processors (not shown), a memory (not shown), and a data interface (not shown). Configurator system 280 can be implemented on a single computer, or in some instances be distributed across a plurality of computers.

Figure 3:
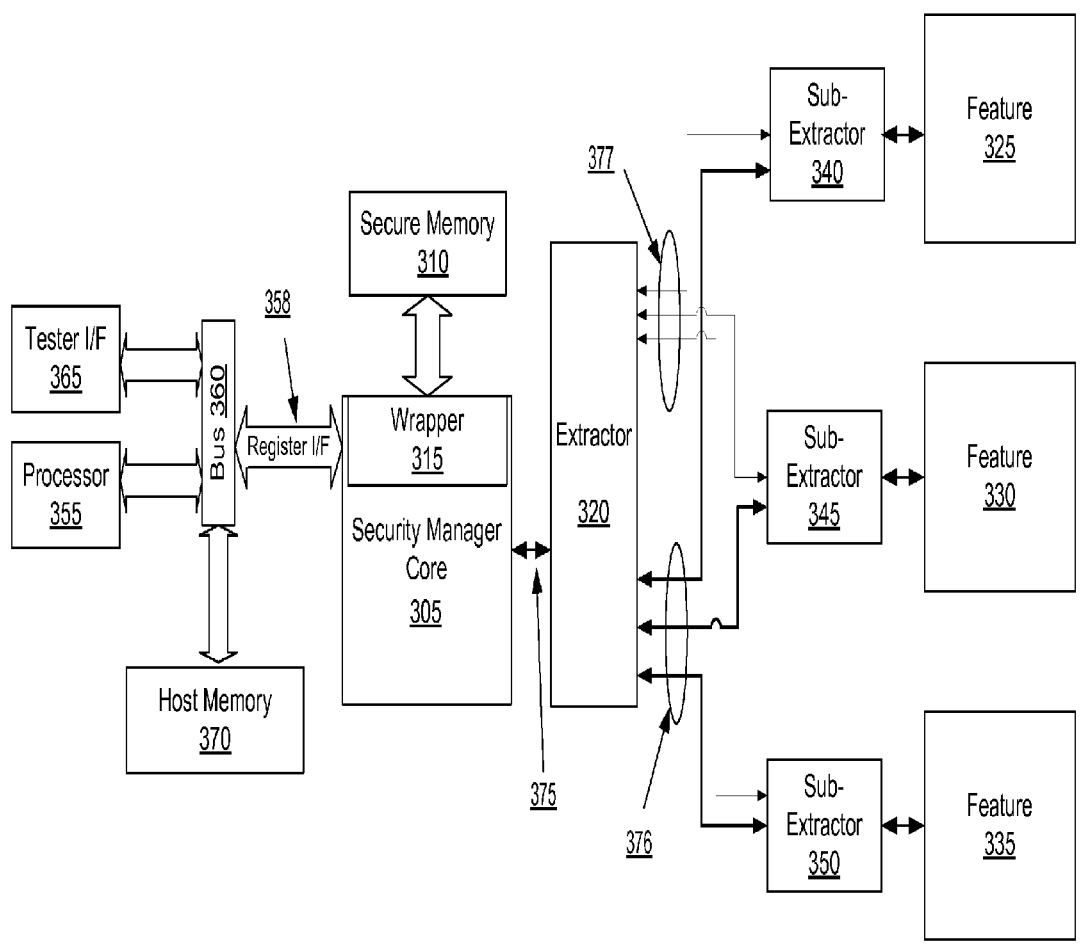
FIG. 3 is a block diagram of an exemplary embodiment of a system including a Security-Manager-enabled IC for performing methods described herein.

FIG. 3 is a block diagram of an exemplary embodiment of a system 300 including a SM core for performing methods described herein. System 300 may include a SM core 305, a secure memory 310, an extractor 320, a bus 360, a processor 355, an extractor interface 375, a key interface 376, a configuration value interface 377, a host memory 370, Features 325, 330, and 335, sub-extractors 340, 345, and 350, register interface 358, tester interface 365, or some combination thereof. The SM-enabled IC includes SM core 305 and secure memory 310, and optionally may include some (or all) of the other elements shown of SM system 300 (e.g., extractor 320, bus 360, processor 355, extractor interface 375, sub-extractors 340, 345, and 350, key interface 376, configuration value interface 377, a host memory 370, Features 325, 330, and 335, etc.). Although only one of each component is shown in FIG. 3, it should be understood that system 300 may comprise more than one of any of the named components. For example, system 300 may have multiple processors 355. Similarly, although the exemplary system of FIG. 3 is shown with a single SM core 305, SM-enabled IC may contain multiple SM cores 305. Further, in some embodiments, system 300 may include tester interface ("I/F") 365 that may be operatively coupled (such as communicatively coupled using optical, electrical, or wireless transmission) to a tester. In some embodiments not shown, one or more sub-extractors 340, 345, and 350 may be combined with extractor 320.

Additionally, in some embodiments (not shown) SM core 305 may directly connect with one or more Features (not shown), and if all such connections are handled directly, extractor 320 and the sub-extractors may not be required. And in some embodiments, Features 325, 330, and 335 may continue to be connected using extractor 320, the one or more sub-extractors (e.g., 340, 345, and 350), and the interfaces (375, 376, 377).

Additionally, SM core 305 may directly read and write signals to other components of system 300. In some embodiments, SM core 305 may sample the system state, read data parameters, etc. via, for example, a dedicated interface (not shown) or via bus 360. For example, SM core 305 may issue read operations over bus 360 to obtain the desired information.

System 300 includes secure memory 310. Secure memory 310 can be a single secure memory and/or multiple homogenous or heterogeneous secure memories. Secure memory 310 may be a form of a digital memory where the setting of each bit may be fixed in a nonvolatile form. Secure memory 310 may include, for example, fuse memory, antifuse memory, one time programmable ("OTP") memory, erasable programmable read only memory ("EPROM"), electrically erasable programmable read only memory ("EEPROM"), RAM (including battery-backed RAM), or some combination thereof. In some embodiments, where secure memory 310 is fuse or anti-fuse memory, secure memory 310 may include redundant pathways that offer the ability to revise information previously stored in secure memory 310 (e.g., by overriding or remapping previously-written data). Depending on the technology and security features present, contents of secure memory 310 may be encrypted and/or authenticated, may be protected from reads by blocks other than SM core 305, may be configured to be one-time-programmable. Also, secure memory 310 may be isolated such that only SM core 305 is connected to secure memory 310, or such that other components of the SM-enabled IC may read from secure memory 310 but only SM core 305 may write to secure memory 310. Secure memory 310 may also be partitioned into one or more portions that may be read by components of the SM-enabled IC other than SM core 305 and one or more portions that may only be ready by SM core 305. SM core 305 may be directly responsible for performing all manufacturing test and programming operations for secure memory 310. Additionally, in some embodiments, secure memory 310 is designed to resist efforts to learn its contents by, for example, removing certain layers from the IC, capturing micrographs of the IC, or electrically probing the IC during operation. Additionally, in some embodiments, SM core 305 includes wrapper 315. Wrapper 315 translates requests from SM core 305 into requests understood by secure memory 310, and vice versa. In some embodiments, secure memory 310 may be integral to SM core 305.

System 300 includes one or more Features 325, 330, and 335. The inputs delivered via the sub-extractors 340, 345, 350 to Features 325, 330, and 335 are generally configurable, thereby providing configurability (e.g., via key management and Feature management operations) of the functionality associated with Features 325, 330, and 335. Such configuration changes may be performed by SM commands (described below) delivered to SM core 305 via register interface 358.

Features 325, 330, and 335 may include hardware, software, and combinations thereof. For example, Features 325, 330, and 335 may be a global positioning service, one or more processors (e.g., CPU, graphics processor, crypto core, etc.), additional memory, USB ports, video input or output ports, audio input or output ports, circuitry providing advanced graphics capabilities (e.g., picture-in-picture, multiple HD video streams, graphics acceleration, etc.), network transceivers for access to one or more networks (e.g., Wi-Fi, near field, BLUETOOTH, etc.), cameras, etc. The above listing of Features should not be considered limiting, as Features may include any component or capability that is configurable via key management or Feature management operations. Feature capabilities are discussed above with reference to, for example, FIG. 2A, and below in, for example, the Feature Management section. In some embodiments, a Feature or part of a Feature is provided by a third party IP provider. Features 325, 330, and 335 are associated with sub-extractors 340, 345, and 350, respectively. In some embodiments not shown, multiple Features may share a single sub-extractor. Sub-extractors 340, 345, and 350 facilitate the delivery of SM core outputs (such as configuration values and keys) across SM-enabled IC designs. Additionally, as discussed above, sub-extractors 340, 345, and 350 are optional, and are generally used for large or complex SM-enabled ICs (including those where top-level ASIC floorplanning and/or routing are challenging) that include multiple Features. Extractor 320 is configured to deliver outputs from SM core 305 to sub-extractors 340, 345, and 350, which in turn deliver signals to Features 325, 330, and 335, respectively.

Exemplary System 300 includes extractor 320. Extractor 320 is a hardware component that is configured to receive and route information (e.g., keys and feature state) from SM core 305 to the appropriate sub-extractor(s) associated with an intended destination Feature, in a form that is appropriate for the Feature. Feature state refers to information that has been processed by SM-core 305 and possibly extractor 320 such that it is in a form that is understandable by the destination Feature. Feature state may have one or more associated addresses in feature space. By way of example, the feature state may include enable signals, metadata, configuration or calibration information, or other data which is useful to Features.

Extractor 320 is operatively coupled to SM core 305, and to one or more Features (e.g., Feature 325, Feature 330, and Feature 335). In some embodiments, extractor 320 is coupled to SM core 305 via an extractor interface 375. Extractor interface 375 provides communication of information (such as feature data, security keys, and the like) from SM core 305 to extractor 320. Feature data may be secret or non-secret, and is general data that is used to configure a Feature. Extractor interface 375 may include wires which couple SM core 305 to extractor 320. Extractor 320 then transfers the information to the sub-extractor(s) associated with each destination Feature via key interface 376, configuration value interface 377, or a combination thereof. Key interface 376 is a communication path configured to pass secret information (e.g., cryptographic keys, such as private keys to public key systems such as RSA and EC-DSA, symmetric keys to cryptosystems such as AES or triple DES, and keys for protocols such as HDCP or EMV). For example, extractor 320 may communicate a 128-bit key and target key address to one or more Features (e.g., 325, 330, and/or 350) via key interface 376. Extractor 320 may be configured to decode a target address to identify a particular sub-extractor associated with the destination feature. For example, sub-extractor 340, sub-extractor 345, and sub-extractor 350 are associated with Features 325, 330, and 335, respectively. Configuration value interface 377 is a communication path configured to pass Feature data associated with Feature management operations. For example, if one or more Features (e.g., 325, 330, 335, or some combination thereof) are being configured or enabled, extractor 320 passes the feature data to the appropriate sub-extractor via configuration value interface 377. Likewise, if a particular Feature does not require (and/or for security reasons may not be permitted to receive) the values associated with given addresses, the extractor and/or sub-extractor can withhold these values from the destinations. Withholding unnecessary values can improve efficiency on ASICs by avoiding the unnecessary routing and delivery of values to sub-extractors or Features that do not need them. In some embodiments, extractor interface 375 provides bi-directional communication of information from SM core 305 to extractor 320. In other embodiments, extractor interface 375 provides one-way communication of information from SM core 305 to extractor 320. Key interface 376 and configuration value interface 377 may include wires which couple SM extractor 320 to one or more sub-extractors 240, 234, and 350.

Extractor interface 375, key interface 376, and configuration value interface 377, or some combination thereof, couple SM core 305 to extractor 320 and sub-extractors 340, 345, and 350. The combination of interfaces may transmit data from SM core 305 to an particular Feature by, for example, continuously sending data values, sending data when a change-of-value event occurs (e.g., enable Feature) or a request is received (e.g., because a Feature is powering on), or some combination thereof.

The current value of each element of the feature space associated with an SM core may be stored in, for example, secure memory 310, or SM private memories (discussed below). In some embodiments, a given operation (for example, processing of an RSB or DSB, discussed below) may update only a subset of the elements of the feature space. In embodiments where change-of-value events are communicated from SM core 305 to extractor 320, it is expected (although not required) that only the values of elements of feature space affected by a particular payload are communicated from SM core 305 to extractor 320 upon processing of that payload. In embodiments where all of the values in feature space are driven continuously from SM core 305 to extractor 320, the values affected by a particular payload may be combined with prior values of unaffected feature space from e.g. SM private memory for communication to extractor 320.

System 300 may include processor 355. Processor 355 can, for example, be a single or multiple microprocessors, field programmable gate array (FPGA) elements, or digital signal processors (DSPs). Specific examples of processor 355 are, for example, an x86 processor, an ARM processor, a MIPS microprocessor, an 8051 microcontroller, etc. Processor 355 may be coupled to SM core 305, host memory 370, tester I/F 365, or some combination thereof, via bus 360. In some embodiments, processor 355 may be configured to directly communicate with SM core 305, read and program secure memory 310 via SM core 305, retrieve SM core 305 status and system state, send commands to SM core 305, receive from SM core 305 cryptographic hashes of software (such as boot routines, operating system components, applications, etc.) authorized for execution by processor 355, or some combination thereof. Additionally, there may a plurality of processors performing these accesses. Additionally, in some embodiments, processor 355 has the capability to run higher privileged code, for example, in Ring 0, using ARM TrustZone®, or in a secure virtual machine monitor (SVMM). Lower-privileged processor 355 or process may be blocked using some or all capabilities of SM core 305. Register interface 358 may be used to communicate the identity and privilege level of the request, and SM core 305 can take the privilege level of the requestor into account when accepting and processing SM commands received across register interface 358.

System 300 may include host memory 370. Host memory 370 may be volatile (e.g., SRAM, DRAM, or other semiconductor memory) or non-volatile (e.g., hard disk, R/W optical disk, flash drive), or some combination thereof. Host memory 370 is operatively coupled to processor 355, SM core 305, tester I/F 365, or some combination thereof. In this embodiment, host memory 370 is coupled to one or more components of system 300 via bus 360.

System 300 may include tester I/F 365. Tester I/F 365 is an interface for tester system(s) (not shown). Tester I/F 365 may be, for example, configured to provide a communication path to SM core 305 when SM core 305 is in a manufacturing state, when the SM-enabled IC is in-field, when processor 355 is not yet operating (or is malfunctioning), or some combination thereof. Tester I/F 365 may be a scan interface, a test interface, joint test action group ("JTAG") interface, universal serial bus interface, advanced peripheral bus ("APB") interface, etc. A tester system may be coupled to system 300 such that it is able to test system 300 for correct operation. For example, the tester system can be configured to ensure that system 300 is properly enabling Features, disabling Features, programming secure memory 310, etc. The tester system may include one or more processors and a memory, and may communicate with (or include) a delegate authority system for authorizing operations in SM core 305.

System 300 includes SM core 305. SM core 305 may be operatively coupled to secure memory 310, extractor 320, and processor 355, host memory 370, and tester I/F 365 via register interface ("I/F") 358 and bus 360. Additionally, in some embodiments (not shown) SM core 305 may be directly connected to some or all of, processor 355, host memory 370, and tester I/F 365. SM core 305 includes one or more SM private memories (not shown). These one or more private memories may be used to store data used by the SM core, including one or more security keys (e.g., base keys, personalization keys, transport keys, netlist keys, root or delegate authority public keys, etc.), one or more pointers to locations within secure memory 310, instructions for wrapper 315, current configuration state associated with feature addresses, command processing intermediates, etc. In some embodiments, one or more security keys and a product chip ID may hardwired into SM core 305 (e.g. root-authority public keys, base keys that must be available if secure memory 310 is malfunctioning or unconfigured, etc.). The one or more security keys may include symmetric keys, public asymmetric keys, private asymmetric keys, or some combination thereof. In some embodiments, the one or more security keys are specific to the SM core, and others may be shared among a series of SM cores. An SM core series refers to a set of SM cores which may be related in some way. For example, the SM cores in all of the SM-enabled ICs manufactured from a given mask design might be considered a series. Alternatively, all of the SM cores in any of a family of similar SM-enabled ICs might be considered a series.

Figure 4:
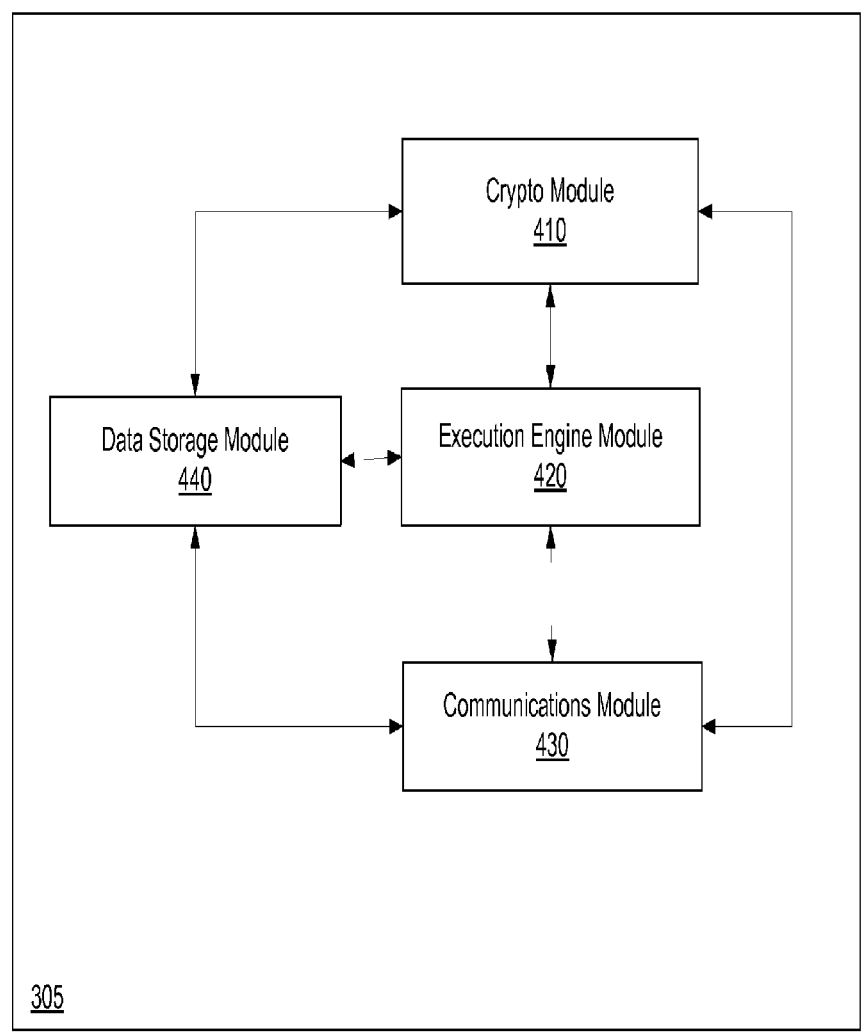
FIG. 4 is a block diagram of an exemplary embodiment of a Security-Manager core.

In an exemplary embodiment, SM core 305 is configured to receive one or more signed blocks, which may include a root-signed block ("RSB") as well as zero or more delegate signed blocks ("DSBs"), which are discussed further with reference to FIG. 4. SM core 305 is configured to verify signatures associated with the signed blocks and extract an associated payload specifying restrictions/bindings (see below) as well as values (e.g., configuration settings or keys) intended for one or more Features (e.g., 325, 330, 335). Examples of restrictions include limitations on which SM cores should accept the payload (such as limitations designating a specific device ID, or required states for values stored in feature address space, or limitations on which features can be manipulated, etc.) SM core 305 may be configured to authenticate the payload using a public key of the root authority, and to extract (e.g., decrypt) the payload from the signed blocks using, for example, a private key built into the SM-enabled IC or derived from values stored in secure memory 210. SM core 305 is configured to distribute some or the results of processing the payload to the intended one or more Features (e.g., 325, 330, 335) via extractor 320.

In some embodiments, SM core 305 may be configured to execute instructions that update the Feature state of the SM-enabled IC, facilitate key delivery to Features, enable configuration of secure memory 310 (such as to configure parameters necessary for writing to the secure memory 310, if any), etc. For example, SM core 305 may be instructed to disable Feature 325 and enable Feature 330. Depending on the embodiment and the instructions provided, SM core 305 may make persistent changes (e.g., by updating secure memory 310), non-persistent changes (e.g., by updating the SM private memory), or both. Persistent changes are those which persist after the SM-enabled IC is powered down, such that the change persists after the IC enable chip re-boots. Non-persistent changes are those which last for a predetermined period of time or events. For example, a non-persistent change may only be good for a certain number of executions, until power is lost on the device, etc. SM core 305 may be configured for managing and delivering keys for secure digital ("SD") card encryption, flash memory/hard disk encryption, high-bandwidth digital content protection ("HDCP"), digital rights management ("DRM") systems, virtual private network(s) ("VPN"), payment instruments (e.g., EMV), password managers, radio link encryption, peripheral authentication, other secure operations, etc.

Additionally, SM core 305 may be configured to receive one or more hardware ("HW") constants that may be used in the IC configuration process. HW constants may include for example, a product chip ID, one or more keys (such as an RSA or EC-DSA public key) for the root-authority system, one or more keys from a delegate-authority system, one or more base keys, one or more additional security keys, parameters for SM core 305 operation (e.g., memory usage, supported commands, etc.), error correction data, etc. A product chip ID can uniquely identify a particular SM-enabled IC, or a particular SM-enabled IC series, or both, with an identification value. The security keys may be symmetric or asymmetric (and, if asymmetric, public or private). In some embodiments, the one or more base keys may be derived from a master key, an identification code of the SM-enabled IC series, a chip-specific identifier, or some combination thereof. Error correction data can include, for example, checksums related to one or more of the security keys.

SM core 305 may be configured to generate interrupts to processor 355. For example, SM core 305 may be configured to generate an interrupt when the feature state of the SM-enabled IC has been updated, when ready to receive additional I/O, when a key has been output, etc.

SM core 305 may be configured to execute one or more built in self checks. For example, SM core 305 may be configured to perform a self-check when first powered up, under the control of the test interface, etc.

In some embodiments, system 300 is a single IC (such as a system-on-chip) that combines all of the components shown in FIG. 3, or most of the components (such as everything except processor 355 and host memory 370).

In some embodiments, all or some of system 300 may be constructed to resist tampering by outside sources. For example, SM core 305 may include a security mesh (not shown) or be fabricated under a security mesh. A security mesh is a wire network fabricated on top of the primary logic circuits, e.g. using one or more of the top metal layers on an integrated circuit. The security mesh may be paired with an active sensor network intended to detect damage to the wires comprising the mesh. In this embodiment, SM core 305 is configured to refuse to perform sensitive operations if the active sensor indicates that some of the security mesh wiring has been damaged. Additionally, SM core 305 may be configured to perform other countermeasures, such as erasing secure memory 310.

FIG. 4 depicts a block diagram of an exemplary SM core 305. Exemplary SM core 305 may include crypto module 410, an execution engine module 420, a communications module 430, and a data storage module 440, or some combination thereof. It is appreciated that one or more of these modules can be deleted, modified, or combined together with other modules.

Crypto module 410 may be a hardware component, a software component, or a combination thereof, configured to provide authentication, encryption functionality, decryption functionality, or some combination thereof. For example, crypto module 410 may be configured to provide symmetric encryption functionality, symmetric decryption functionality, asymmetric encryption functionality, asymmetric decryption functionality, asymmetric signing/signature verification, key agreement, or some combination thereof. In some embodiments, crypto module 410 may be configured to verify one or more digital signatures associated with a root signed block ("RSB"). The RSB can include, for example, one or more SM commands, command templates, one or more delegate permissions, one or more keys (e.g., a delegate public key), or some combination thereof. The RSB contains at least one digital signature signed by the root-authority's private key (i.e. private key of root-authority system 217). Crypto module 410 may be configured to authenticate the digital signature of the RSB using the corresponding root authority public key. In some embodiments, authentication may be performed using RSA, DSA, or ECDSA. In other embodiments (such as those where extraction of the authentication secret from the SM-enabled IC is not a concern), authentication may be performed using a symmetric authentication scheme, such as HMAC. The authentication scheme may use a combination of these or other algorithms. The authentication scheme may implement a standard such as PKCS#1 or ANSI X9, or may be proprietary.

Additionally, crypto module 410 may be configured to verify one or more digital signatures associated with a delegate signed block ("DSB"). A DSB may include, for example, one or more SM commands, a payload (encrypted or unencrypted), one or more keys, or some combination thereof. In one embodiment, each DSB is always preceded by an RSB that specifies and authorizes the delegate authority's public key. The DSB may contain at least one digital signature signed by the delegate-authority system (e.g., delegate-authority system 222). After receipt and verification of a valid DSB, crypto module 410 may (as appropriate for the DSB) derive one or more mixed keys, one or more transport keys, one or more validators (e.g., values used for key verification), or some combination thereof, using one or more base keys in the SM-enabled IC. Additionally, crypto module 410 may be configured to combine a plurality of keysplits to form one or more base keys.

Additionally, in some embodiments, the RSB and/or DSB may contain encrypted payload portion(s). In this embodiment, crypto module 410 may be configured to decrypt and validate the encrypted payload portion(s), e.g. using base keys or keys derived from base keys. Crypto module 410 is configured to provide verified commands to execution module 420 once the RSB, or DSB, or both, have been authenticated. Crypto module 410 can be coupled to execution engine module 420, communications module 430, and data storage module 440.

Additionally, the DSB, subject to a set of allowable permissions, may indicate that it is associated with another following DSB, and may further limit the following DSB to a different (e.g., narrower) set of allowable permissions than the first DSB.

In some embodiments, the crypto module 410 may be configured to negotiate a random session key with a device or component external to the SM core, such as a tester or CPU application using a register I/F (e.g. register I/F 358). The negotiated session key can, for example, be used to open a secure tunnel or protect secrets that are communicated in a subsequent RSB, DSB, or both.

Additionally, aspects of exemplary RSBs and DSBs are discussed in detail below with reference to FIGS. 5-9B.

Execution engine module 420 may be a hardware component, a software component, or a combination thereof configured to receive and execute SM commands. SM commands may be received from a root-authority system (e.g., root-authority system 217), a delegate-authority system (e.g., delegate-authority system 222), a secure memory (e.g., secure memory 310) associated with SM core 305 (e.g., during the boot process), or some combination thereof. SM commands may include, for example, load commands, key derivation commands, decryption commands, secure memory write commands, conditional operations, policy configuration operations, etc. Load commands may, for example, enable non-persistent changes to configuration outputs delivered to Features and/or to state used internally to the SM core. Key derivation commands may be used to derive one or more security keys from a base key using, for example a key tree, as discussed in detail below. Decryption commands may be used in decrypting a received payload and in decrypting/outputting secret keys output to Features. Secure memory write commands may be used to write specific instructions or other changes to the secure memory. (For example, a write command may be used to make a persistent change to the SM-enabled IC.) Conditional operations may be used to determine whether (or which) other commands are appropriate to run on a particular SM core. Policy configuration operations may be used to specify limitations on what other commands may do (see below).

In addition to the SM commands discussed above, some SM commands (e.g., policy configuration commands) may, for example, restrict use of an RSB or DSB: to a specific product chip ID; to a range of product chip IDs; to a particular product manufacturer; to a given chip series, based on the value of any Feature configuration managed by the SM core; to require that the delegate test certain feature(s) when using the block; or some combination thereof. In some embodiments, the SM commands may also restrict the RSB, or DSB, or both, to by "single use" by requiring the incorporation into the RSB/DSB digital signature of a random one-time challenge derived by the SM core (e.g., based on a random number generator). Policy configuration commands can also impose limitations based on the state of signals connected to the SM core from other hardware, for example, the output from tamper detection circuitry, the error status of secure memory 310, etc. Execution engine module 420 can be coupled to crypto module 410, communications module 430, and data storage module 440.

Communications module 430 may be a hardware component, a software component, or a combination thereof configured to act as an interface between SM core 305 and the outside world. For example, communications module 430 may be configured to interface with a CPU (e.g., processor 355), a host memory (e.g., host memory 370), a secure memory (e.g., secure memory 310), an extractor (e.g., extractor 320), a tester interface (e.g., tester I/F 365), any other components on the IC, or some combination thereof. Communications module 430 may be configured to receive commands from one or more busses (e.g., via bus 360), the secure memory, etc. Additionally, communications module 430 may help send information to various Features (e.g., directly, or via extractor 320, or both). In some embodiments, communications module 430 includes a secure memory wrapper (e.g., wrapper 315). The secure memory wrapper is configured to translate commands from SM core 305 to a format recognizable by the secure memory associated with SM core 305. Communications module 430 can be coupled to crypto module 410, execution engine module 420, and data storage module 440.

Data storage module 440 may include one or more SM private memories. Data storage module 440 may be configured to store one or more security keys (e.g., device keys or group of device keys), product chip ID, one or more SM commands, boot instructions, feature data, configuration data, persistent feature information, etc. In some embodiments, data storage module may additionally store information used to make persistent changes in SM core 305 operation, such as information about memory layouts and usage. Data storage module 440 may include or interface with one or more memory structures external to SM core 305 (such as static RAMs), or may incorporate internal storage (e.g., registers, register files, static RAM, etc. if such storage is volatile, or volatile memories may be used if available). Data storage module 440 may also store cryptographic value, such as a delegate-authority system public key. Data storage module 440 can be coupled to crypto module 410, execution engine module 420, and communications module 430.

3. Security Manager Functionality

For the root-authority to request that a SM core in an SM-enabled IC perform an operation (e.g. update keys or feature state), the root-authority system defines the operation in terms of one or more SM commands. SM commands, when executed, may (among other things) update the Feature state managed by the SM core in the SM-enabled IC. The root-authority system encodes the SM commands in a binary format recognized by the SM core and includes a digital signature to the commands. The combination of commands and signature is known as a signed block. Signed blocks from the root-authority system are referred to as root-signed blocks ("RSBs") and signed blocks from a delegate-authority system are referred to as delegate-signed blocks ("DSBs").

Figure 5:
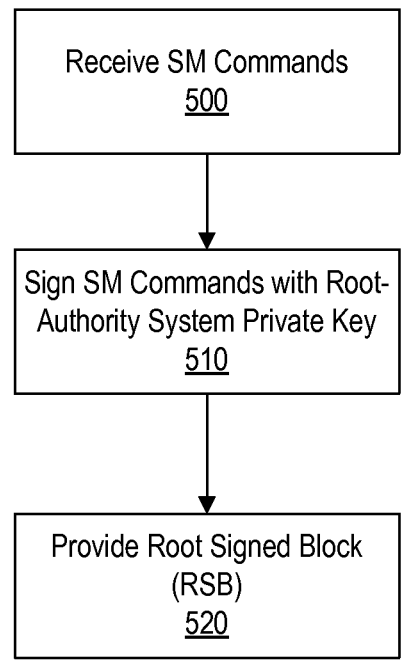
FIG. 5 is a flow chart of an exemplary method for generation of a root-signed block for commands signed by a root-authority system

In a simple case not involving a delegate-signed block, the SM core in an SM-enabled IC receives commands from a root-authority system. The root-authority system public key may be built into the SM-enabled IC. FIG. 5 is a flow chart of an exemplary method for generation of a root-signed block including commands signed by the root-authority system. In step 500, the root-authority system receives one or more SM commands, e.g. from a signing request or an input file. The block of SM commands are then digitally signed (510) by the root-authority system using the root-authority system private key to create the RSB. In step 520, the completed RSB is provided by the root-authority system. The recipient of the RSB may be an SM core with which the root authority can communicate (e.g., via tester I/F 365), or the RSB may be passed via any number of entities (e.g., intermediaries, servers, components, applications, networks, storage locations/files, etc.) before ultimately being received by the SM core.

Figure 6:
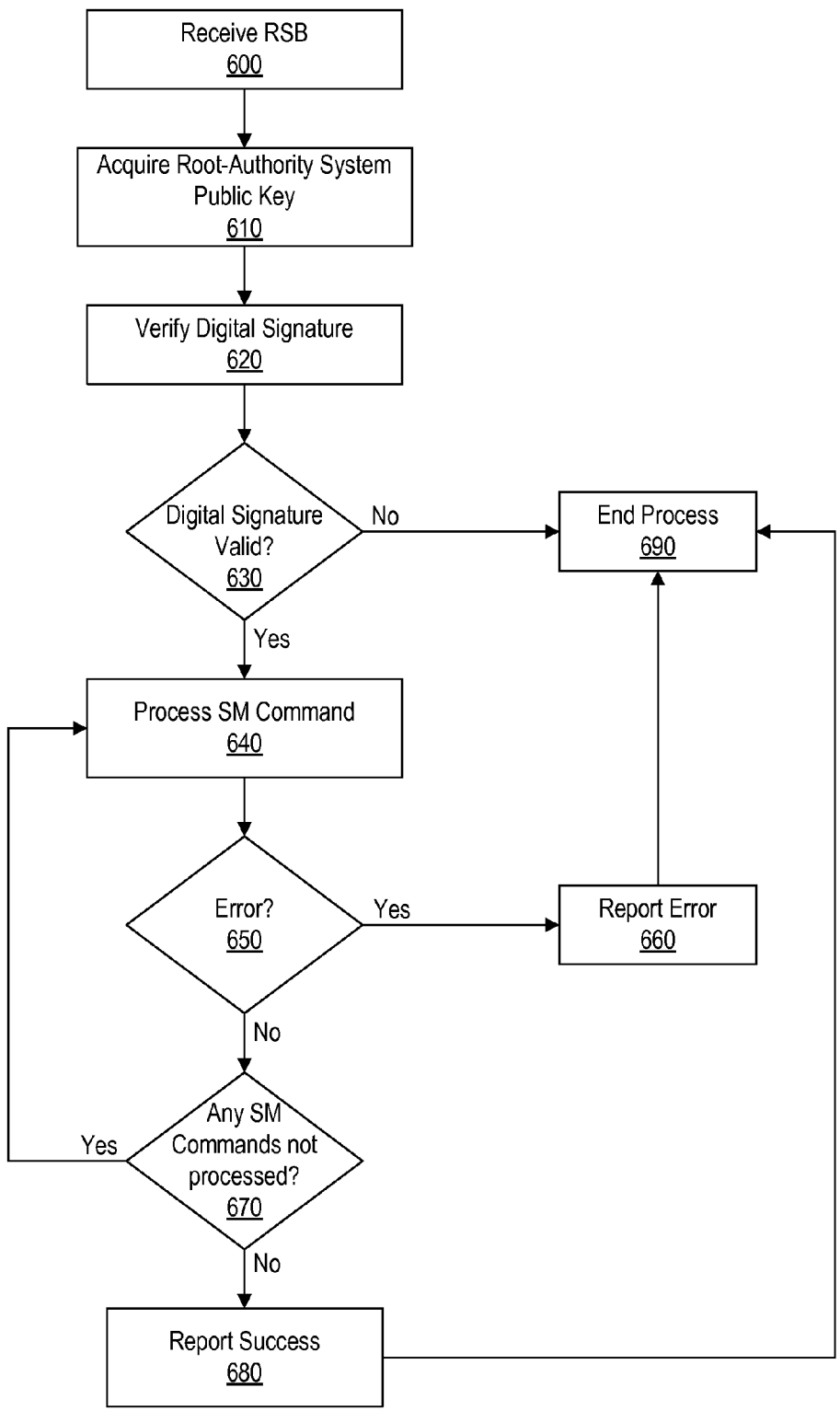
FIG. 6 is a flow chart of an exemplary method for processing, by a Security-Manager core, the root-signed block generated in FIG. 5.

FIG. 6 is a flow chart of an exemplary method for processing, by the SM core in the SM-enabled IC, the RSB generated in FIG. 5. In step 600, the RSB is received at the SM core. The SM core then acquires (610) the root-authority system public key, which for example may be stored in the SM-enabled IC and supplied as a hardware constant to the SM core, or may be stored in a secure memory (e.g., secure memory 310).

The SM core then verifies (620) the digital signature of the RSB using the root-authority system public key. If the digital signature verification result (630) indicates the signature is not valid, the process ends (690). If the digital signature is valid, the SM core processes (640) one or more SM commands contained in the RSB. If an error occurs (650) while processing the SM command(s), the error is reported (660) using, for example, register I/F 358 or an interrupt, and the process ends (690). An error may occur, for example, if an SM command checks whether a product chip ID falls within a particular range, and the product chip ID known to the SM core falls outside this range. If no error occurs during processing, the SM core determines (670) if any additional SM commands remain to be processed. If there are additional SM commands that need to be processed, the flow goes back to step 640, and the process continues until all the SM commands are processed. Once all the SM commands are processed, the SM core reports success (680) using, for example, register I/F 358 or an interrupt, and the process ends (690).

Figure 7:
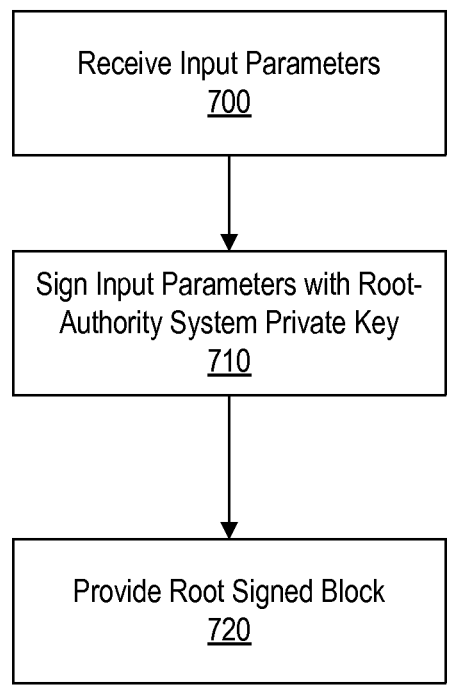
FIG. 7 is a flow chart of an exemplary method for generation of a root-signed block that can be associated with a delegate-signed block.

FIG. 7 is a flow chart of an exemplary method for generation of a RSB that can be associated with a DSB. In step 700, the root-authority system receives one or more input parameters. Input parameters can include one or more SM commands, command templates for what the delegate is intended to sign, delegate permissions, a delegate-authority system public key, other data, or some combination thereof. The delegate-authority system public key has a corresponding delegate-authority system private key which is controlled by the delegate-authority system.

As discussed above, SM commands may contain information that direct the SM core to affect the state of the SM-enabled IC. Additionally, when the RSB is associated with a DSB (e.g., contains the delegate-authority system public key), the SM commands may (as with the RSB-only case above) include commands which halt processing based on certain conditions. For example, the RSB can include commands which confirm that the chip is at a certain stage of manufacturing, or is within a specific product chip ID range, or is within a particular serial number range, or has settings associated with a particular group or subset, or is/isn't in a particular error state, etc., before continuing with RSB processing and permitting the associated DSB to run. Note that the ability to base conditionals on state maintained by the SM core (such as device lifecycle, product OEM identifier, user type, geographic region, group identifier, retail SKU, date, etc.) allows a great deal of flexibility in controlling which devices can accept a given RSB, and what the RSB will do on those devices. Thus, DSBs may be prevented from being executed on devices not meeting criteria set forth by the root-authority system.

In some embodiments, the root-authority system may also receive and sign command templates that designate the form, or content, or both of DSBs. The delegate-authority system can verify the signature of the root-authority system as a way to ensure that it will only sign DSBs of the intended form. Within a command template may be descriptions of included SM commands, as well what adjustments may be made. A hardware security module in the delegate-authority system can verify the root signature on the template, make permitted modifications (or verify that only permitted modifications have been made), then (if successful) sign the delegate signed block (DSB). Note that this approach permits the root authority to impose limitations on delegates (by way of the delegate-authority system). Note that such limitations on delegate signing are complementary to limitations enforced by the SM core (e.g. if the RSB includes tests that confirm a product chip ID lies in a given range, an error will occur prior to any acceptance of the DSB if run on a device outside of the range).

Delegate permissions typically describe capabilities which the root authority allows the delegate to have over an SM core. For example, delegate permissions may include authorizing particular Features for updating, authorizing writing to a range of physical addresses within secure memory 310, authorizing which SM commands may be executed by the SM core while processing the DSB, authorizing destinations for transmittal of security keys, authorizing access to one or more key busses, authorizing access to one or more peripheral devices, or some combination thereof An RSB (or, if authorized, DSB) can set permission data fields in the SM core. These may, for example, be mapped to addresses in feature space. Such settings may persist unless (or until) they are changed by another RSB or until the chip is reset. For example, an exemplary RSB, when processed by the SM core, may set bits in a series of capability masks to specify if certain capabilities may be exercised. In another example, the RSB, when processed by the SM core, may adjust pointers in the SM core that control assumptions the SM core makes about the layout and configuration of secure memory 310.

The RSB, when processed by the SM core, may also prepare data for use by a subsequent DSB. For example, the RSB may cause data to be stored in a data storage module (e.g., data storage module 440), and the DSB may cause that data to be retrieved from the data storage module. Additionally, prior to execution of the RSB, a processor (e.g., processor 355) may cause data to be stored in the data storage module, for example, by utilizing register I/F 358. The RSB may cause the SM core to inspect that data for conformance with certain criteria, and if the criteria are satisfied, leave that data in the data storage module 440 for use by a subsequent DSB. In this case, even though the data is provided by the processor rather than the root-authority system, the data is nonetheless subject to the approval of the root-authority system. For example, this makes it possible for firmware on a device to provide parameters that are not signed by a root or delegate authority.

An RSB may require that the DSB signature include a certain amount of "binding data" of a form specified by the RSB. This forces the DSB signing process to be performed separately for each instance where the binding data changes. For example, the RSB can direct the SM core to sample a value generated by a random number generator, and require that the DSB signature include the sampled value, which forces the DSB signing authority be in a "live" connection with the SM core and prevents replay of the DSB. In another example, the RSB can set the binding data to include the device ID and lifecycle state, preventing the signed DSB from being replayed on other devices. Because the binding data is incorporated in the signature by the delegate authority system (and hence is known to the delegate authority system and can be in delegate authority system logs that are reported to security service 120), the RSB may also specify as binding data and parameters that the root authority wishes to ensure are accurately logged.

In some embodiments, an RSB, when processed by the SM core, is able to write to a one-time programmable (OTP) memory (e.g., secure memory 310) associated with the SM core. For example, the instructions contained within the OTP memory may, as part of a boot up process, enable feature X of an SM-enabled IC. A RSB may direct the SM core to modify secure memory 310 such that feature X is enabled, or is no longer enabled, during the boot up process. Additionally, in some embodiments, a DSB may also be granted permission to make (typically limited) changes to the contents of a programmed OTP memory.

In step 710, the input parameters are formed into a root signed block, which is digitally signed by the root-authority system using the root-authority system private key to create the RSB. In step 720, the RSB is delivered, e.g. to the delegate-authority system or a security service (e.g., security service 120) that oversees delegate-authority systems.

Figure 8:
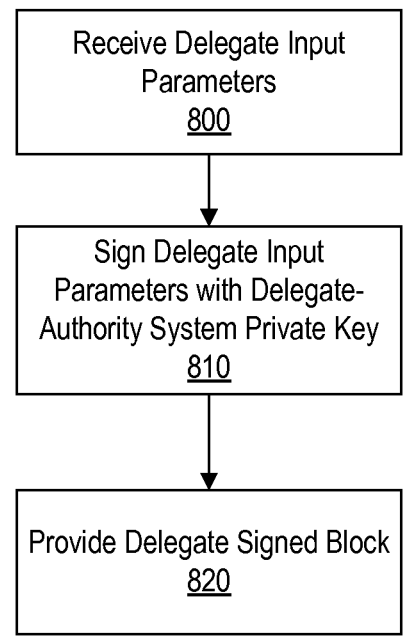
FIG. 8 is a flow chart of an exemplary method for generation of a delegate-signed block.

FIG. 8 is a flow chart of an exemplary method for generation of a DSB. In step 800, the delegate-authority system receives one or more delegate input parameters. Delegate input parameters may include, for example, the RSB generated in FIG. 7, one or more SM commands for inclusion in the DSM, other payload data (encrypted or unencrypted), one or more keys, or some combination thereof. SM commands may include SM commands which, when executed, update the feature state of the SM-enabled IC. SM commands may be received as part of a command template signed by a root-authority system, as described earlier. In step 810, the delegate input parameters may be digitally signed by the delegate-authority system (using the private key that corresponds to the delegate-authority public key contained in the RSB) to create the DSB. In step 820, the DSB is provided to, for example, an SM-enabled IC (either directly or various intermediaries) and processed by the SM core.

In some embodiments not shown, the delegate-authority system verifies the delegate permissions within the RSB before digitally signing the delegate input parameters. This can, for example, help prevent problems where the RSB is corrupted or delegate authority system has been asked to sign something that exceeds from what the root authority authorized.

Figure 9A:
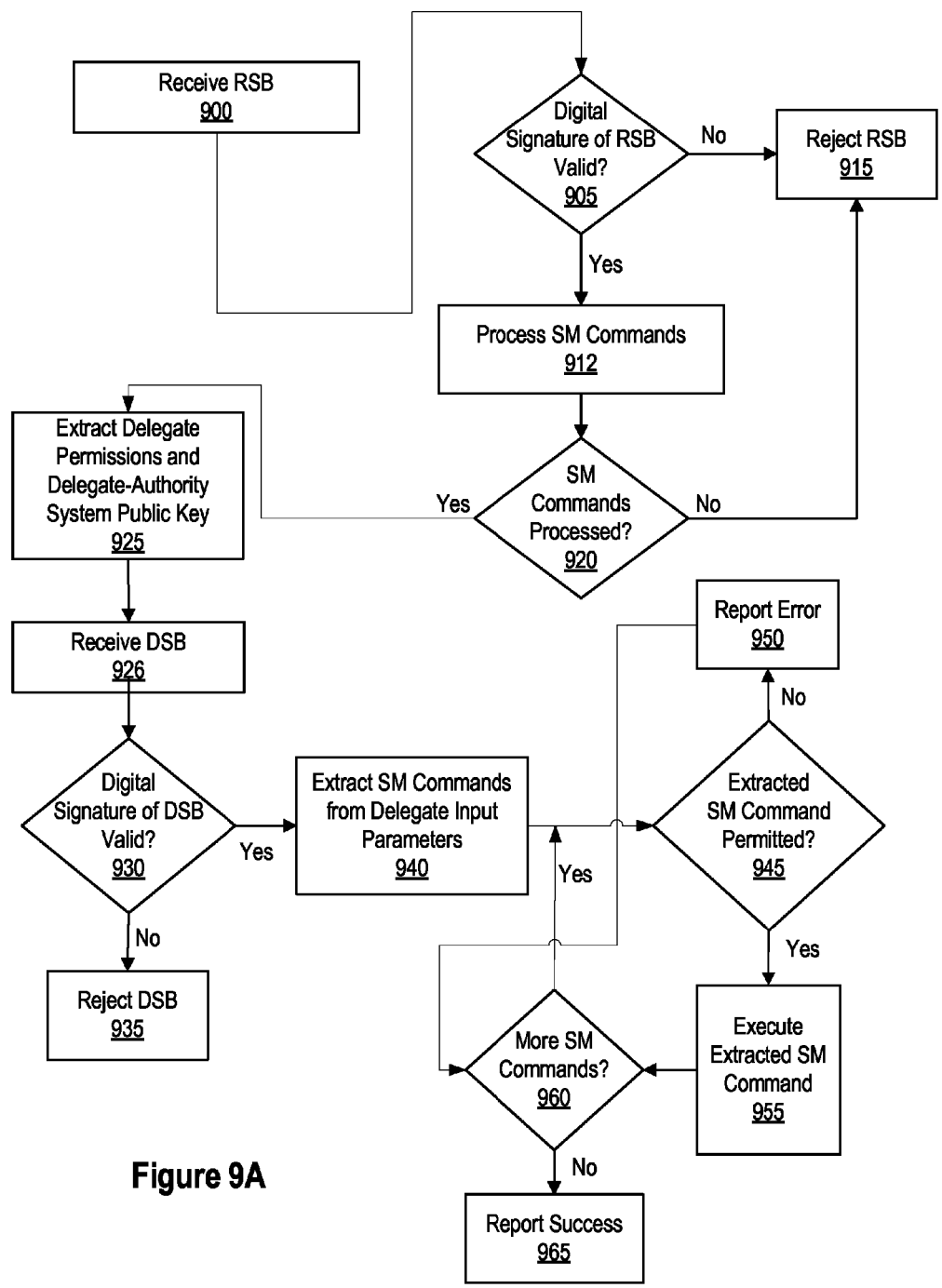
FIG. 9A is a flow chart of an exemplary method for processing, by a Security-Manager core, the delegate-signed block generated in FIG. 8 and the associated root-signed block.

FIG. 9A is a flow chart of an exemplary method for processing, by the SM core, the DSB generated in FIG. 8 (as well as the associated RSB). In step 900, the RSB associated with the DSB is received at the SM core. The SM core then verifies (905) the digital signature of the RSB using the root-authority public key. If the digital signature is not valid, the RSB is rejected and the process ends (915). If the digital signature is valid, the SM core begins processing (912) the SM commands contained in the RSB.

If any of the one or more SM commands fail to process or otherwise generate an error (920), the RSB is rejected and the process ends (915). For example, if a range of product chip IDs over which the delegate-authority system is configured to have limited SM programming capabilities was designated by SM commands in the RSB, and the SM-enabled IC possesses a product chip ID outside the range, the SM core should fail and reject the RSB (915). In this embodiment, if the process ends at step 915, and if the associated DSB arrives it may be ignored and discarded without being processed. In other embodiments not shown, the SM core may receive the RSB and DSB at the same time. In such embodiments, if the process ends due to an error while processing the RSB, the DSB may be ignored and discarded without being processed. In other embodiments not shown, the SM core may receive the DSB concurrently with processing of the RSB, or before the RSB is received. Regardless of the way that a particular embodiment of an SM core receives RSBs and DSBs, if an RSB is rejected, the SM core can refuse to process (or otherwise reject) any associated DSB.

If the SM commands within the RSB are processed successfully, the SM core extracts (925) delegate permissions and the delegate-authority public key from the RSB. In step 926, the SM core receives a DSB that is associated with the RSB. As noted above, in some embodiments not shown, the DSB and the RSB may be received at the same time or at different times.

The SM core verifies (930) the digital signature of the DSB using the delegate-authority public key included in the RSB. If the digital signature is not valid, the DSB is rejected and the process ends (935). If the digital signature is valid, the SM core extracts (940) SM commands from the delegate the DSB. The SM core then determines (945) if the extracted SM command is permitted. The SM core makes this determination by comparing the extracted SM command to the delegate permissions, and inspecting the SM commands for conformance with the delegate permissions contained in the RSB. If the extracted SM command is not allowed by the delegate permissions, the extracted SM command is not executed, an error is reported (950), and the flow goes to step 960. The error may be reported to software running on the SM-enabled IC, a tester, etc. which may in turn notify the delegate authority, the root authority, or other entities as appropriate.

If the extracted SM command is permitted, the SM core executes (955) the extracted SM command. In some embodiments not shown, an error may occur during execution of the SM command, in which case the flow can go to step 950.

The SM core then determines (960) if any extracted SM commands remain to be processed. If all the extracted SM commands have been processed, the SM core reports (965) successful execution of the DSB. The report may be reported to a user of the SM-enabled IC, the delegate authority, the root authority, or some combination thereof. But, if additional SM-commands remain to be processed the flow goes to step 945.

In some embodiments not shown, when an extracted SM command is not permitted and an error is reported (960), the process then ends and the DSB block is rejected.

Figure 9B:
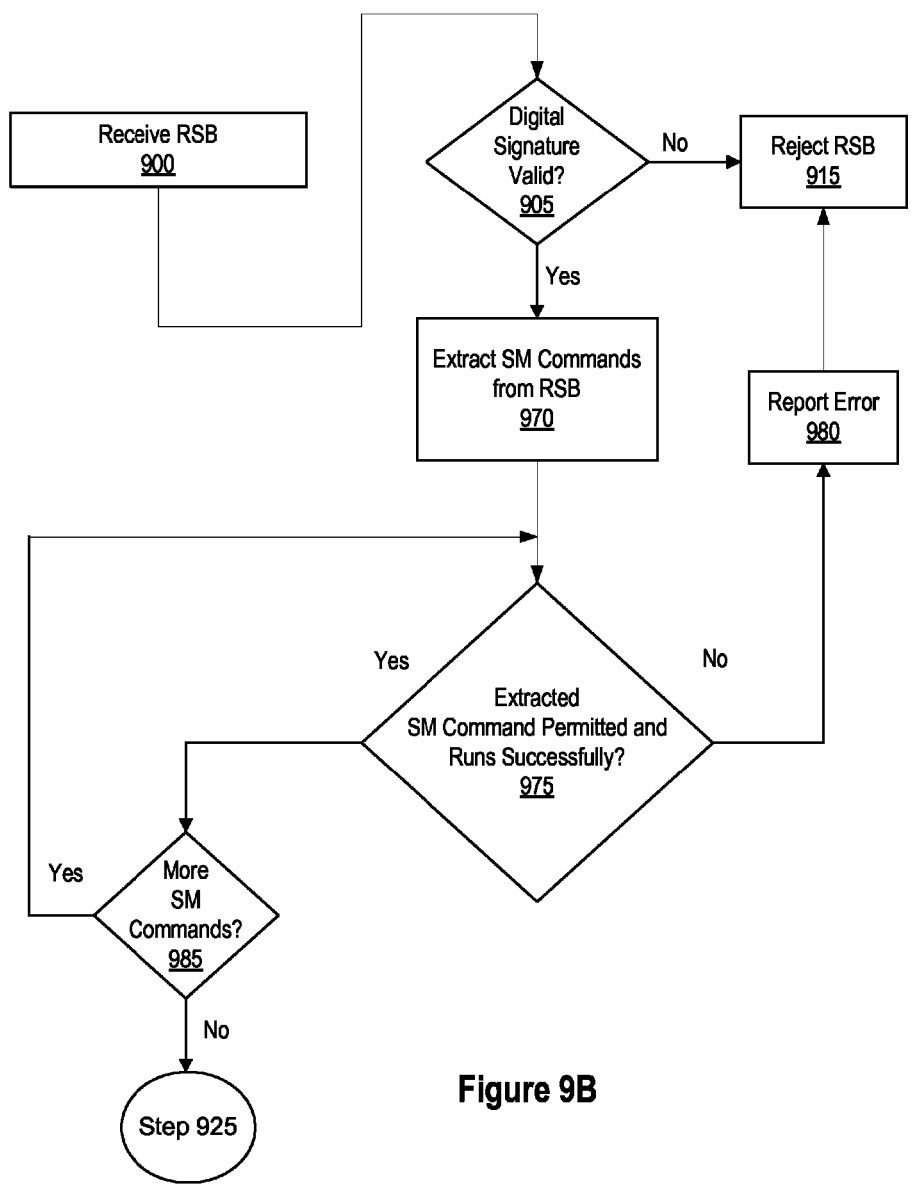
FIG. 9B is a flow chart of an exemplary method for processing, by a Security-Manager core, commands retrieved from a root-signed block.

FIG. 9B is a flow chart of an exemplary method for processing, by the SM core, SM commands retrieved from an RSB. Steps 900, 905, and 915 are as shown in FIG. 9A. The remainder of FIG. 9B details an exemplary embodiment of the steps to process SM commands (912) and check the results (920) from FIG. 9A. The detail in FIG. 9B begins once the digital signature is confirmed valid. The SM core extracts (970) one or more SM commands from the RSB. The SM core determines (975) if the restrictions in effect permit the execution of the extracted SM command. If the command is not authorized, step 975 triggers an error. Step 975 then attempts to run the command, which may also trigger an error. Upon an error, the SM core reports the error (980) and rejects the remainder of the RSB (and consequently any associated DSB (915)). If the extracted SM command runs successfully, the SM core then determines (985) if any extracted SM commands remain to be processed. If any further commands await, the process continues with the next command. Once all the extracted SM commands have been processed, the method proceeds to step 925 in FIG. 9A.

The comparison tests (e.g., in RSBs and/or RSBs) may test, for example, whether two values are greater or less than each other, are equal to each other, etc. Additionally, in some embodiments, the comparison test may incorporate bit masks or other any other kinds of tests. The result of a comparison may be an immediate error, or a flow control change (e.g., such as a jump) or modification/skip of subsequent operations.

In some embodiments the delegate-authority system may be required to test certain feature space value(s). This may be useful when the specific feature space value(s) are not available to the root-authority system. For example, the root-authority system may want to authorize a delegate-authority system to produce DSB(s) that modify the configuration of certain features of a single SM-enabled device, versus, for example, all SM-enabled devices in the network. In this embodiment, the root-authority system only produces a single RSB, rather than producing a different RSB for each of the one or more SM-enabled devices of which features are to be modified. Note that forcing binding of DSBs to single devices forces the delegate authority system sign make a new DSB for each device—thereby ensuring that limits imposed on the number of signing operations by the delegate authority system effectively limits the number of devices that a delegate authority can configure.

As an example, the SM-enabled IC may, while processing an SM command extracted from the RSB, write a value (e.g., product chip ID, or a random one-time challenge) to an intermediate storage location. When the SM core verifies the signature of the DSB, the SM core incorporates the contents of the intermediate storage in the cryptographic hashing operation involved in the signature verification process. For example, the value in the intermediate storage may be concatenated with the DSB commands when computing the cryptographic hash. If, when the SM-enabled IC verifies the DSB signature, the value in the intermediate storage is not the same as the value used by the delegate-authority system when producing the DSB, the computed hash will not match the signed hash and the SM core may then reject the DSB.

Additionally, in some embodiments the RSB causes the SM core to restrict or modify the activity that may be performed by a DSB using an intermediate storage to hold one or more SM command(s). In this embodiment, SM command(s) in the RSB may cause data to be written to the intermediate storage. The SM core then verifies the DSB signature, and if valid, the SM core then treats the data written to immediate storage as a command, and executes the data. For example, the data in intermediate storage may have been a representation of the command "write the value 64 to feature address X" (e.g., where X might configure the radio frequency). By formulating the entire command, the RSB in this example authorizes the delegate-authority system only to set the frequency only to 64, and not to any other value. In an extension of this embodiment, the RSB may contain delegate permissions allowing the DSB to modify a limited portion of the intermediate storage, thus authorizing the DSB to make limited variants of the command. For example, if the delegate were only allowed to change the least-significant 4 bits of the parameter corresponding to the frequency, this would allow the delegate-authority system to set the frequency to any value from 64 to 79.

In an embodiment, the SM core manages a secure time reference that is used to filter control messages for feature and key management. The time reference may be maintained within the SM core or may be in a separate block that provides the time to the SM core. In this example, a signed block (e.g., RSB, DSB) may direct a key output or feature adjustment but is only usable if the time lies within a certain time window. The signed block includes commands that cause the SM core to perform a directed comparison with the current time value. For example, this can be used to prevent trial keys or trial features from being loaded outside a trial period. For added security, the time reference can be managed and set by SM feature signals (e.g., so that the time is traceable to the clock on a secure server). In this case the aforementioned RSB-specified binding data can be used to require that time setting be performed in a live interaction with a root or delegate-authority system acting as the signing authority. Alternatively, a trusted time source may be created by allowing the reference to be adjusted by untrusted software, but where a tracking value (either within or external to the SM core) monitors if the device time reference has been adjusted, powered down, or reset since the time reference was tagged as valid via a live RSB and/or DSB interaction with a trusted time server.

3.1 Feature Management

Feature management may be used to control whether, and in what ways, the configuration and other feature state of SM-enabled IC is updated. The feature state of the SM-enabled IC can control the capabilities of the SM-enabled device, for example, the ability to enable, disable, or otherwise securely configure operation of Features, ability to configure hardware capabilities based on product chip ID, to configure hardware capabilities based on geographic location of the SM-enabled IC, configure performance settings, allow or configure use of certain external interfaces, bypass use of certain modes of operation (e.g., enable/disable bug fixes modes that bypass certain functional modes of operation, patch ROM, adjust microcode, etc.), enable or disable test modes (e.g., control diagnostic and debug mode), control over when a particular mode or Feature is active (e.g., only active during the manufacturing process), the ability to adjust parameters used by Features, adjust configuration of the SM-enabled IC, perform audit operations to attest to the configuration or other information accessible to the SM core, securely perform diagnostic activity on an in-field devices, calibrate or tune analog circuits to compensate for process variation, set device configuration data (e.g., configuring a PLL for the input clock and desired operating frequency in a specific product), adjusting the power and frequency of radios based on regulatory requirements applicable for a specific product or region, configuring the limits enforced by an internal thermal failsafe (thermal limits may vary based on the packaging and cooling solution used in different products), configuring a battery charging circuit, enable latent capabilities or upgrades of the SM-enabled IC, disabling display of advertising messages on the SM-enabled device (e.g., by providing software with configuration status), enabling in-field upgrade to a higher operational performance of a CPU on the SM-enabled IC, etc.), etc. (or combinations thereof). For example, controlling diagnostic and debug mode may temporarily (e.g., until next reset)

enable a debug Feature. Additionally, in some embodiments, whether or not the feature state is updated depends on whether a fee has been paid (e.g., as managed by billing and reporting service 122).

An exemplary architecture of an SM core (and the SM-enabled IC) assumes that feature configuration settings are non-secret, but alteration of feature settings requires privileges (e.g. which originate from the root authority). For secret keys, it may be additionally required to protect the secrecy of the values, so secret values may be handled by using the key management functionality, discussed in more detail in the next section. Digital signatures may be used to ensure that the feature changes (as well as key-related operations) may be performed only by authorized parties.

Feature management may include recording feature changes in a non-volatile memory (e.g., secure memory 310), enabling feature changes that are active only until the next reset, enabling feature changes that are only valid for a fixed period of time (as measured by a clock cycle counter or a real-time clock), enabling select modes of operation (e.g., controlling diagnostic and debug mode, PLL configuration, etc.), or some combination thereof.

Figure 10:
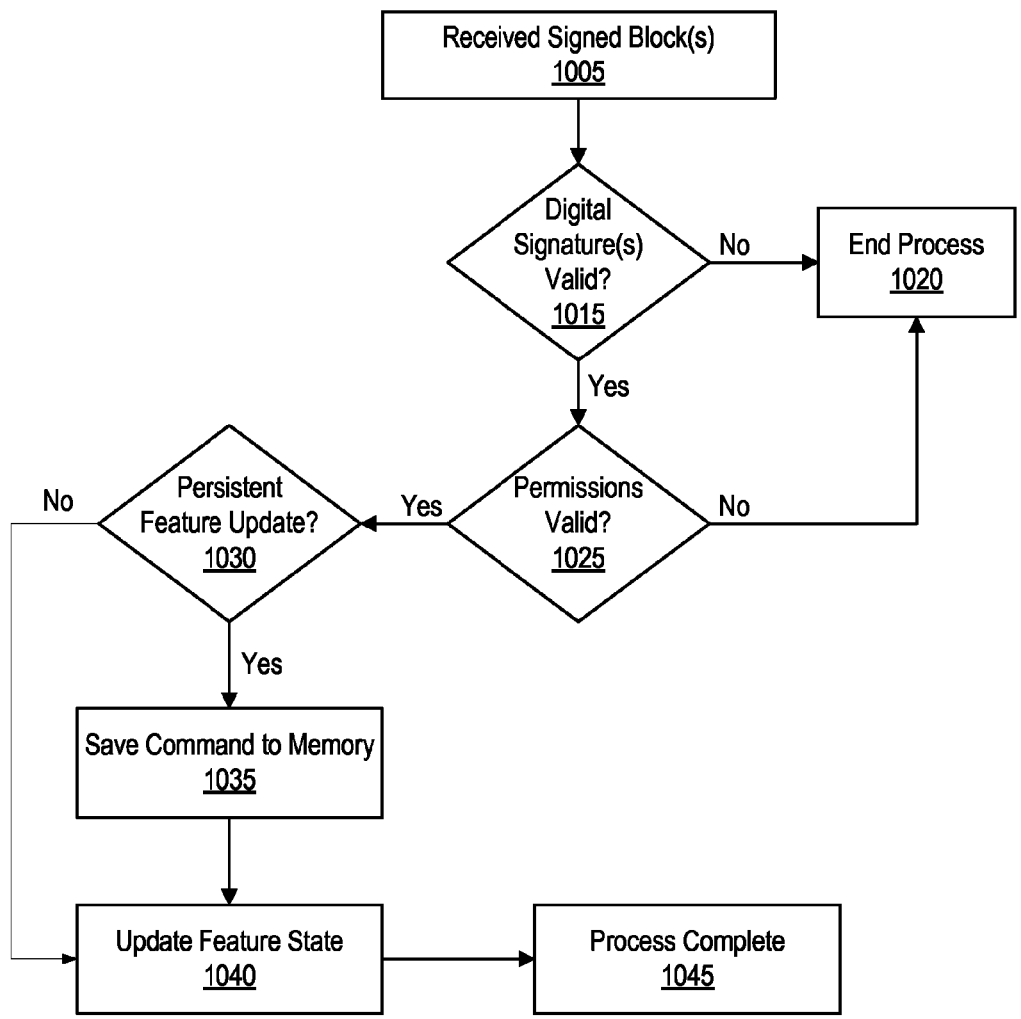
FIG. 10 is a flow chart of an exemplary method for feature management within a Security-Manager-enabled IC.

FIG. 10 is a flow chart of an exemplary method for feature management of an SM-enabled IC. In step 1005 the SM-enabled IC receives one or more signed blocks (e.g., one or more RSB, DSBs, or a combination thereof). The signed blocks contain update information that, when processed by the SM core in the SM-enabled IC, enable the SM core to update the feature state it manages. Information may include for example, one or more SM commands, one or more keys, or a combination thereof. The SM core validates (1015) the digital signature of the signed block using the corresponding public key. For example, if the signed block is a RSB, the SM core uses the root-authority public key (e.g., stored in the SM-enabled IC) to validate the digital signature. Similarly, if the signed block is a DSB, the SM core may use the delegate-authority public key (from the RSB) to validate the digital signature of the DSB. In alternate embodiments, the SM-enabled IC (or the device containing the IC) may contact the root-authority system, the delegate-authority system, a third party server, or some combination thereof, to retrieve the appropriate public key or other information needed.

If the digital signature is not valid then the process ends (1020). If the digital signature is valid, the SM core determines (1025) whether the current permissions allow the requested feature update. In this embodiment, permissions can be set from SM-commands or settings in secure memory 310, RSBs, DSBs, or some combination thereof. If the permissions do not allow the feature update the process then ends (1020). If the permissions do allow the feature update, the SM core then determines (1030) if the SM command is to be executed as a persistent feature update. (A persistent feature update is one that continues after the SM-enabled IC is reset, e.g. because the change is recorded in a nonvolatile memory.) If yes, the SM core saves (1035) an SM-command, key value(s), a feature configuration value, or a combination thereof, as appropriate to perform the persistent feature update to the non-volatile secure memory (e.g., secure memory 310), and optionally also updates (1040) the corresponding feature state in the SM core. If the SM command is not to be executed as a persistent feature update, the process moves to step 1040, updates the feature state managed by the SM core, and the process is complete (1045).

3.2 Key Management

Key management functionality may be used to securely deliver payloads, for example secret keys or other values. Destinations may include software executing on the SM-enabled IC, hardware blocks, or even other parts of a device containing the SM-enabled IC. The SM-enabled IC contains several permanently-stored device-specific symmetric keys (the base keys). The base keys can be used to bootstrap the secure delivery of additional keys. After receiving a signed block containing a payload, the SM-enabled IC validates the signatures of the block(s) and any associated permissions before extracting the payload. Upon encountering a key management command, the SM-enabled IC conducts a key unwrapping process that first derives a transport key from a base key, then uses the transport key to decrypt a key contained in or referenced by the command, and finally passes the decrypted key to another hardware unit. As discussed above, with reference to FIG. 3, the decrypted key may, for example, be passed directly, or via an extractor, key interface, and sub-extractor to the hardware unit. Key management commands do not need to be run in a secure facility; payloads may be delivered in-field over untrusted communications channels to products containing SM-enabled ICs.

In one embodiment, the key unwrapping process uses a key tree construction that provides protections against side-channel and fault induction attacks. A key tree construction enables creation of multiple different keys from a single starting key, and each of the created keys may then successively be used to create multiple additional different keys. Alternate embodiments of the key unwrapping process may use, block ciphers (such as AES), asymmetric algorithms (e.g., RSA), etc.

Figure 11:
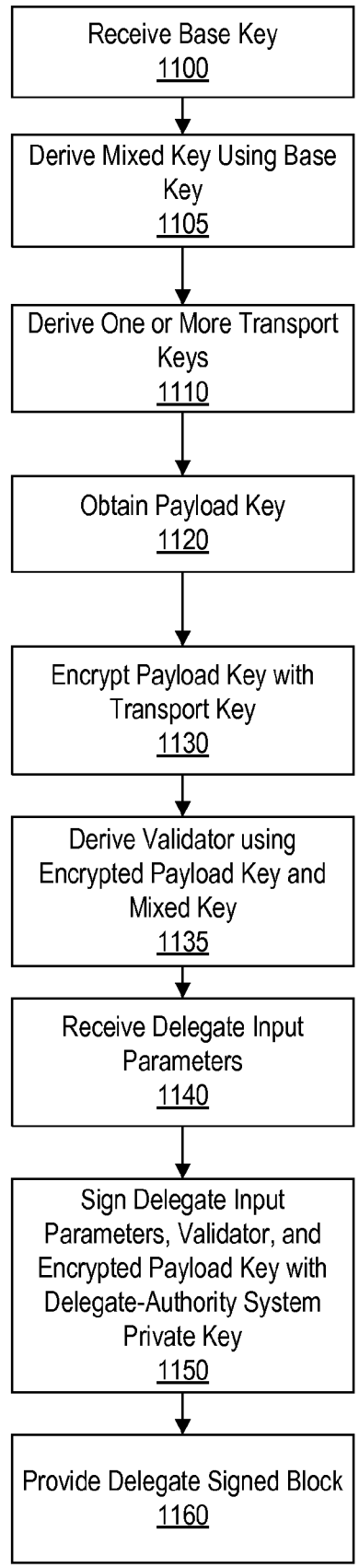
FIG. 11 is a flow chart of an exemplary method for generating a delegate-signed block for transport of a payload key.

FIG. 11 is a flow chart of an exemplary method for generating a DSB for secure transport of a payload. As discussed above, the payload may include a secret key. In step 1100, the delegate-authority system receives a base key for its calculation. The base key may be, for example, a global base key or a chip-specific base key. The delegate-authority system may receive the base key from for example, IC manufacturer 110, product vendor 125, or security service 120. The delegate-authority system may also determine the base key by decrypting or otherwise processing a value stored in the product (e.g. in the secure memory 310 for the SM core).

In various embodiments, a global base key may be used by multiple SM-enabled ICs. For example, a global base key may a root-authority system key provided to the SM-enabled IC as a HW constant. In other embodiments, the base key is device-specific key, e.g. a base key programmed into the SM core. In some instances the device-specific key is in part derived from a product chip ID. In another embodiment, the delegate-authority system obtains a mixed key or a precursor to the mixed key (rather than the base key). For example, if each chip has a unique device-specific device key $K_{CHIP}$, the root authority may distribute (e.g. via security service 120) to the delegate-authority system with a table/database of $F(K_{CHIP}, DelegateID)$ for each chip, where F is a cryptographic operation such as a hash, allowing the delegate appliance to use the table entry for the chip as its mixed key (or to form the mixed key), while the RSB can direct the SM core to compute F(KCHIP, DelegateID) for the particular delegate's DelegateID to arrive at the same value. More generally, the delegated base key may be delivered as part of a delegated key database, and are derived using a primary base key known to the SM core, parameter values (such as the delegate ID) that are either known to the SM core or can be delivered to the SM core (e.g. in the RSB and/or DSB), and one or more key generation functions. For example, the mixed key may be derived using key ladders, HMAC, hash functions, or other key derivation methods. The database may contain, for example, one delegated base key per chip or more. A delegated base key may be generated by the root-authority system. For example, the root authority may derive the device specific base key from a master key using, for example, AES and a series of one-way functions. Derivation and key control in this manner may help prevent higher-value keys from being compromised should a third party improperly manage keys.

In step 1105 (unless the mixed key was already derived earlier, e.g. per alternate embodiments described above), the delegate-authority system derives a mixed key. The delegate-authority system may derive the mixed key by using a series of one or more one way functions on the key derived in the prior step. For example, the mixed key may be derived using key tree operations, HMAC computations, hash functions, or other key derivation methods. The additional abstraction from the base key may help protect the base key from direct attack.

In step 1110, the delegate-authority system derives one or more transport keys from the mixed key using a series of one way functions. Step 1110 may involve symmetric cryptography, asymmetric cryptography, one-way cryptographic functions, or some combination thereof. The delegate authority system may then obtain the payload key, by for example, deriving the payload key from a master key, or retrieving the payload key from a precomputed data table or fetching the payload key over a network. In some embodiments, the precomputed table may be generated by a third party that issues keys (such as an entity responsible for issuing keys for a particular system or protocol such as HDCP, EMV, etc.), or was previously generated by the delegate authority system. Payload keys may be stored encrypted, then decrypted by the delegate authority system as part of the process of obtaining (1120) the payload key.

In step 1130, the delegate-authority system encrypts the payload key using one or more transport keys.

In step 1135, delegate-authority system derives a validator using the encrypted payload key and the mixed key (or another key). Specifically, the validator may be generated by providing the encrypted payload key and the mixed key as inputs to a series of one or more one way functions whose ultimate output is the validator. The validator enables a SM core (or potentially other recipients of the encrypted payload key) to verify that the encrypted payload key is valid and unmodified.

In step 1140, the delegate-authority system receives one or more delegate input parameters (which may include, in addition to other values involved in signing, an address of where the SM core and extractor/subextractors should ultimately deliver the payload). And in step 1150, the delegate input parameters, encrypted payload key, and validator are then digitally signed by the delegate-authority system using the delegate-authority system private key to create the DSB. In step 1160, the DSB is provided.

Alternatively, in some embodiments not shown, step 1135 is omitted, and accordingly in step 1150 the validator is not digitally signed and not part of the DSB being provided (1160).

Figure 12:
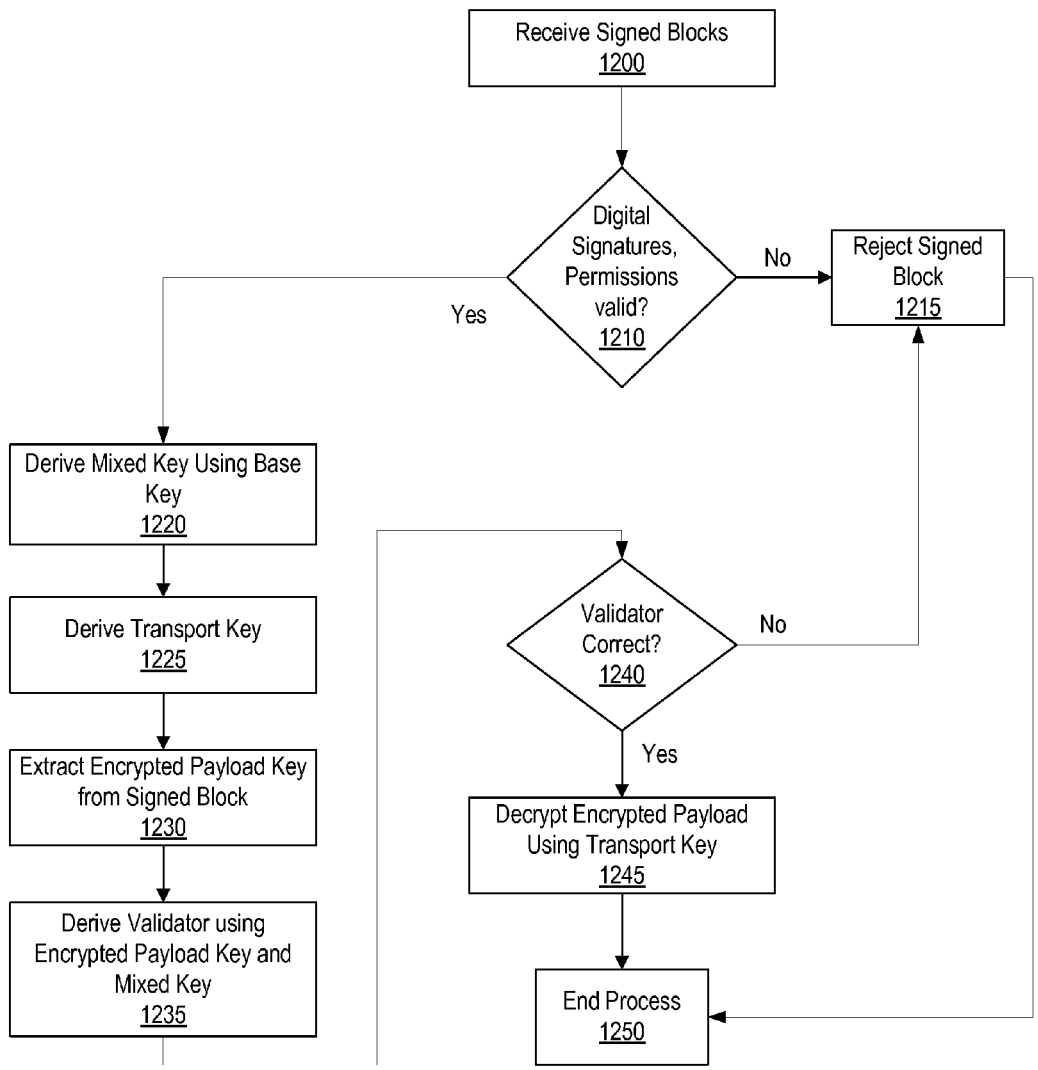
FIG. 12 is a flow chart of an exemplary method for processing, by a Security-Manager core, one or more signed blocks that include a payload.

FIG. 12 is a flow chart of an exemplary method for processing, by the SM core, one or more signed blocks that include a payload. For example, the one or more signed blocks may be a RSB and an associated DSB (e.g., generated via the process of FIG. 11). In another embodiment, the payload may be included within a RSB without a DSB.

In step 1200, one or more signed blocks (e.g., one or more RSB, DSBs, or a combination thereof) are received at the SMcore. Additional unsigned data (such as an encrypted payload with validator) may also be received. These elements may be received at the same time, or at different times.

In step 1210, the SM core verifies that the digital signatures of the one or more signed blocks, and verifies that the delegate permissions of any DSBs are valid. The verification process is similar to that described above with reference to FIGS. 9A and 9B. If the digital signatures for the one or more signed blocks are not valid, or the delegate permissions are not valid, then the SM core rejects (1215) the one or more signed blocks and the process ends (1250). If, however, the digital signatures and permissions are valid, the SM core derives (1220) a mixed key using a base key (e.g., global key or delegated base key) known to the SM core, e.g. using the same algorithm used to generate the mixed key (see the description related to FIG. 11). The SM core may then derive (1225) a transport key using the base key and the same algorithm used to generate the transport key in FIG. 11.

The SM core extracts (1230) the encrypted payload key from the DSB (or from the RSB or from unsigned data, if that is where the encrypted payload is present), and derives (1235) a validator using the encrypted payload key and the mixed key using the same algorithm used to generate the transport key in FIG. 11. The SM core may then determine (1240) if the validator is correct. The SM core makes this determination by comparing the validator derived in step 1235 with the validator received with the payload key (e.g., in the DSB). If the two validators do not match, this is an error (1215) and the process ends (1250). If the validators do match, the SM core decrypts (1245) the encrypted payload key using the transport key and the process ends (1250).

Alternatively, in some embodiments not shown, steps 1235 and 1240 are omitted, and accordingly the encrypted payload key may be decrypted without the use of the validator. Steps 1235 and 1240 may also be substituted with other methods of verifying a validator, e.g. by verifying the validator without independently computing it (such as by verifying an RSA, EC-DSA, or other digital signature contained in the validator).

Additionally, in some embodiments (not shown), the encrypted payload key is not extracted from the DSB (1230), but instead may (for example) be retrieved from an RSB (or other signed block), from a secure memory (e.g., secure memory 310), provided separately from the signed blocks over a register I/F (e.g., register I/F 358), or retrieved from a private memory within the SM core.

3.3 Audit

At various times it may be desirable to verify the state of an SM-enabled IC. Auditing capabilities can, for example, be used to ensure that a previous feature management command has been properly applied to a device, or to verify the authenticity of a device. For example, if a customer requests a refund of a transaction that enabled a Feature, it may be desirable to verify that the Feature has been disabled before refunding the purchase price.

The general audit process can include receiving a challenge from an auditing entity. This challenge can be a random parameter, and is included to allow confirmation that the response was generated in response to a particular request. After receiving a challenge, the SM-enabled IC may generate an attestation demonstrating (1) that it knows a secret key (e.g., a base key specified in the audit command), and (2) that it knows either the value of the appropriate state or a property of the state (e.g., that it satisfies criteria specified in the challenge). For example, in response to an audit command, an exemplary SM core may compute an audit attestation value which is a function of a secret key and of the bits in the feature state being audited. The inclusion of the secret key in the audit calculation prevents an adversary who does not know the secret key from forging audit responses. The auditing entity ultimately verifies the response. State auditing may use symmetric cryptography (such as message authentication codes) and/or public key cryptography (such as digital signatures) to secure attestations.

In an exemplary embodiment, audit requests may optionally contain a validator demonstrating that the command signer also knows the selected secret key. The SM core can, for example, only produce an audit attestation if this validator matches an internally-computed reference. A validator on the request can help prevent an unauthorized party from invoking audit commands.

The value of any feature state, including SM core internal features, may potentially be audited. For example, to use audit functionality to verify that a previous feature management command has been properly applied to the SM enabled IC, the previous command can set an internal bit indicating its success, then this bit can subsequently be audited. If the objective of the auditing entity is only to verify the authenticity of a device containing an SM core (but not its state), it may not be necessary for any feature state to be incorporated in the response.

Auditing can be performed using any keys available to the SM core, including global keys, device specific keys, keys shared by a series of SM-enabled ICs, or some combination thereof. In embodiments using device-specific keys, a database of keys may be made available to the auditor (for example, by a root authority, an IC manufacturer, a product vendor, a security service, etc.) to facilitate verification of the audit response (as well as possibly creation of audit requests).

4. Configurator and Compiler Functionality

Figure 13A:
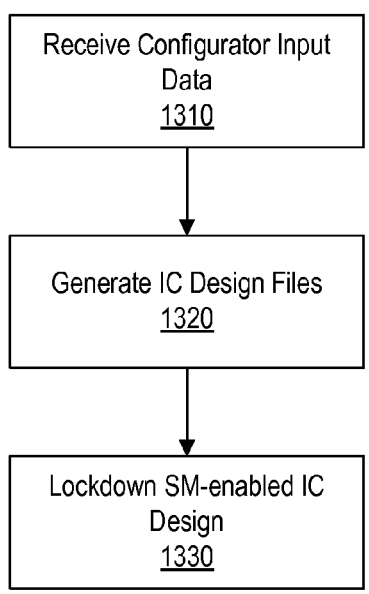
FIG. 13A is a flow chart of an exemplary method for utilizing a configurator system during the design process of a Security-Manager-enabled IC.

A configurator system (e.g., configurator system 280) may be used during the design process of a SM-enabled IC. The configurator system is operated during the ASIC design process to track and automate the mapping of SM core managed feature space and keys to Features and other destinations or uses in the IC. FIG. 13A is a flow chart of an exemplary method for utilizing a configurator system during the design process of an SM-enabled IC. In step 1310, the configurator system receives configurator input data. Configurator input data may include one or more configurator input files, hardware ("HW") constants, or some combination thereof.

The one or more configurator input files define information about the desired configuration for a SM-enabled IC. For example, these files may specify such things as names and sizes (e.g., number of bits) for configuration values, which configuration values should be delivered to each Feature, grouping or location of configuration values within feature address space, default (e.g., power-on) values for configuration values, names and attributes for security key bus destinations, security key bus attributes (such as key sizes for destinations), secure memory mapping attributes (such as information about the layout of secure memory 310), or some combination thereof.

The HW constants may be contained in configurator input files or received separately. Examples of HW constants input to the configurator may include, for example, product chip IDs, one or more keys from the root authority (potentially including a root authority public key), one or more keys from a delegate authority, one or more base keys, one or more additional security keys, error correction data, etc.

In step 1320, the configurator system generates IC design files. These IC design files may include an extractor hardware definition(s), sub-extractor hardware definition(s), and state cache data (e.g., IC configuration map information). In some embodiments, prior IC configuration map information may be included with the configurator input data in step 1310 to minimize modification of the existing circuit design layout when incorporating changes to the SM-enabled IC design. In this case, the configurator seeks to identify the least-impactful way to make a requested change. For example, if a new value is to be inserted into the feature address space, this may include using the previous map to identify a previously-unused location for the insertion (e.g., as opposed to re-creating the locations for existing values). Likewise, if a value is removed from the feature address space, the configurator may use the previous map information to leave a gap as opposed to relocating remaining features.

Figure 13B:
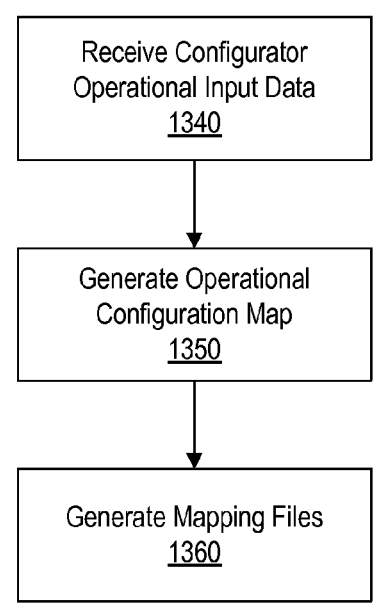
FIG. 13B is a flow chart of an exemplary method for utilizing a configurator system after chip development.

The chip design is locked down (step 1330), e.g. as the chip design is prepared for large-scale manufacturing. At this point, configurator outputs that affect the mask sets used in manufacturing can no longer be changed. FIG. 13B is a flow chart of an exemplary process for how the configurator may be utilized after the chip design is committed for manufacturing.

In step 1340, the configurator system receives configurator operational input data. Configurator operational input data may include the IC configuration map generated in FIG. 13A as well as additional data (e.g., in an operational SM configuration file). The operational SM configuration file may describe, for example, policies about how features and keys associated with a particular SM-enabled IC may be used, changes to naming conventions, layout and configuration conventions for the SM core's use of secure memory 310, and mapping of internal features to feature addresses.

In step 1350, the configurator system internally generates the operational configuration map. Because the steps in FIG. 13B can be performed later than those in FIG. 13A, the map generated at step 1350 can be a more comprehensive and up-to-date mapping of feature address ranges than could be prepared during FIG. 13A, but the process in FIG. 13B generally must assume that outputs from FIG. 13A that actually affect the chip hardware cannot be changed.

In step 1360, the configurator system generates mapping files from its operational configuration map. These mapping files include one or more command mapping files and one or more firmware mapping files. Command mapping files are, for example, files used to map commands into a form understandable by an SM core. For example, if the root authority system wishes to convey a particular configuration value to a given Feature, this file can help the root authority system identify the feature space address corresponding to that configuration value and Feature. Firmware mapping files are files that contains defines and structures needed for software development (e.g., C or C++ header and source file, etc.). In some embodiments, the operational configuration map may be included with the configurator operational input data in step 1340 to minimize modification of the existing operational design when incorporating additional changes to the operational input data.

Additionally, in some embodiments, the configurator system generates documentation files. Documentation files provide an overview of the SM-enabled IC design, such as list(s) of assigned names in feature space and the associated addresses, list(s) of which configuration values are sent to each Feature, information about supported keys, default values for values in feature address space, etc. Additionally, documentation files can include environment and construction principles used in design of software components. The documentation files may be output in formats such as XML, HTML, text, PDF, WORD, etc.

5. Operational Ecosystem 5.1 Secure Memory Command Segments and the Power-on Process In an exemplary embodiment, a command segment region resides in a secure memory 310 that is part of a SM-enabled IC. This region holds SM commands that are executed by the SM-enabled IC on each reset. Stored SM commands are organized in segments, and may be used to effect persistent settings of value(s) in feature space and other cases where it is desirable for the SM-enabled IC to execute a command on each reset (e.g., to deliver a key such as a firmware decryption key) and/or carry configuration operations persistently within the SM-enabled IC.

Secure memory is typically persistent and in some embodiments (such as those using one-time programmable memories) may not be overwritten easily, which can necessitate measures to improve robustness. One possible failure is "tearing," which is an interruption during the write process, for example due to a power failure. It is desirable that an interrupted command segment write not render the SM-enabled IC unusable on future resets. Another possible failure is corruption of the data stored in the secure memory, e.g. due to silicon degradation or external conditions. Again, it is desirable that the impact be minimal and that a single corruption event should be unlikely to render the SM-enabled IC unusable. It is also desirable that corruption of the secure memory (e.g., as part of an attack) not enable circumvention of any restrictions on SM-enabled IC operation being enforced by the SM-core.

SM commands may contain information controlling the manner in which a SM core writes to a secure memory. For example, there might be a tear-resistant flag (tear resistant mode), or a resume on error flag (resume on error mode), or a combination.

When tear resistant mode is active, an exemplary SM core writes a "skip word" to the secure memory at the start of the process of writing a command segment (or other write operation). If the write is not completed, the skip word causes the SM core to recognize this (e.g. so it can skip over the region containing the partially-written data) on subsequent resets. After writing the skip word, the SM core can write the payload (e.g., the main command segment contents), and then finally obliterates (e.g., by setting all bits in the word to a value of 1) the skip word. When not using the tear resistant mode, the SM-enabled IC does not write a skip word, which saves one word of the secure memory, but means that the SM core may register a serious fault on subsequent resets if the write does not complete. (A serious fault may cause the SM core to enter a reduced-functionality state that the SM-enabled IC enters, e.g. because proceeding to operate normally might compromise security.) Once the skip word is obliterated, the segment becomes mandatory and will be used on each subsequent reset (i.e., the SM-enabled IC would raise a serious fault if it encountered an uncorrectable problem reading the segment after the skip word was obliterated). The choice of whether to use a tear-resistant mode may depend on the programming environment, e.g. the improved efficiency of disabling tear resistant mode may be preferable in a controlled factory environment, while tear resistance may be mandatory for in-field writes.

For resume on error mode, the SM-enabled IC sets a flag in the command segment header indicating that it is acceptable to ignore the command segment if there is a problem reading the segment out of the secure memory. For example, the resume on error flag might be set on a segment that enables capabilities of the SM-enabled IC. If the SM-enabled IC skips the segment, because it cannot be read from the secure memory, while the capability of the SM-enabled IC may be lower than if the segment had been properly read and processed, no security risk is created.

The SM-enabled IC may allow neither, one, or both of the tear resistance and resume on error flags to be specified for any given segment (or other data value) written to the secure memory. The SM-enabled IC may also require use of a particular combination of modes for all writes to secure memory.

Figure 14:
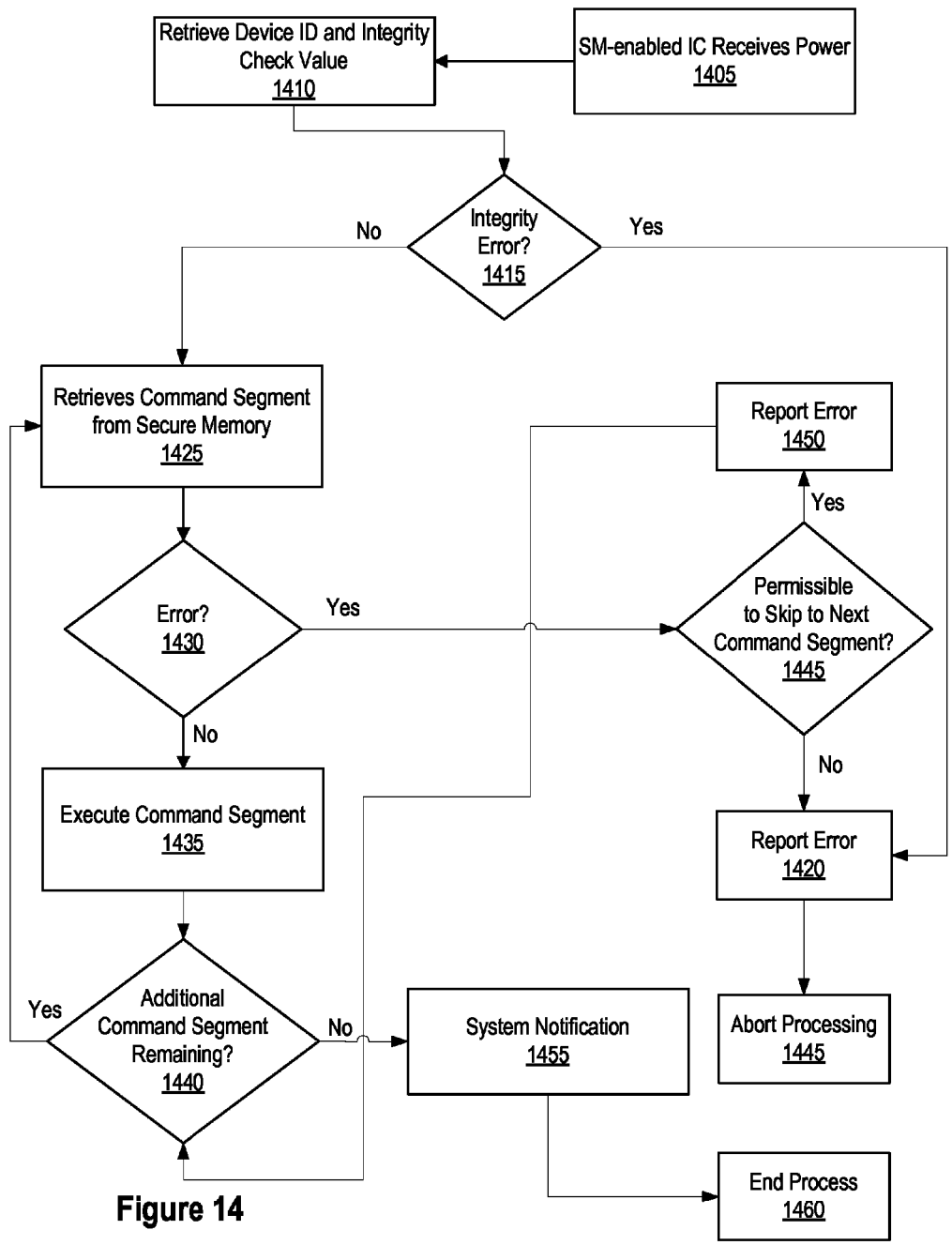
FIG. 14 is a flow chart of an exemplary method for initialization of a Security-Manager-enabled IC.

After reset, the SM core automatically initializes feature and key state as directed by the command segments stored in its secure memory (e.g., secure memory 310). FIG. 14 is a flow chart of an exemplary method for initialization of an SM-enabled IC.

In step 1405, the SM-enabled IC is powered-on or reset. The SM core may be reset as part of this step. The SM core then retrieves (1410) a product chip ID associated with the SM-enabled IC and an integrity check value. (The integrity check value may be a value associated with, for example, a parity check, hamming code, etc.) The SM-enabled IC performs an integrity check (1415) to determine if an integrity error has occurred (e.g., the product chip ID or the integrity check value has become corrupted). If an integrity error occurs, the error is reported (1420), the process is aborted (1445) and the SM core may enter a "serious fault" state. If no integrity error occurs, the SM core retrieves (1425) a command segment from the secure memory.

The SM core processes the command segments contained in the secure memory in a predictable order. For example, the segments may be located consecutively in the secure memory, or each segment may contain the memory address of the next segment to be processed. In some cases, an error (1430) may cause the SM-enabled IC to be unable to reliably determine the location of the next command segment to process, in which case the core may attempt to locate the next segment using a fallback mechanism (e.g. searching for a known header value), or treat this as a serious fault. If an error does not occur, the SM core executes (1435) the command(s) in the command segment. The SM core then determines (1440) if any additional command segment remains to be executed. If so, the flow moves to step 1425.

If no command segments remain, the SM core notifies (1455) the system external (e.g., processor 355, Features or other portions of the SM-enabled IC, or the device which incorporates the SM-enabled IC) that the initial feature state is ready. This notification may be used by the SM-enabled IC to sequence the boot-up of other portions of the chip, for example, by holding all portions of the SM-enabled IC other than the SM core in reset to ensure that necessary values from the SM core are ready before other components need them. The process then ends (step 1460).

Referring back to step 1430, if an error occurs, the SM-enabled IC determines whether it is permissible to skip to the next command segment (1445). For example, the header of the command segment may contain a skip word or a resume on error flag, which instruct the SM core to skip the problematic command segment. If it is permissible to skip the problematic command segment, the SM-enabled IC can report the non-fatal error (1450) (e.g., by saving error information for later analysis) and move to step 1440. If the SM-enabled IC determines that it is not permissible to skip the problematic command segment, a more serious error is reported (1420), and the process is aborted 1445.

The SM core may initialize base keys, for example, before, during, or after the initialization process described in FIG. 14. For maximum performance and flexibility, the SM core may only initialize those base keys required by the command segments performed during boot, then initialize remaining base keys after the rest of the SM-enabled IC is released to boot up.

In some embodiments, errors in the secure memory (e.g., memory integrity error) may be repaired by the root-authority system. The errors may have, for example, been written by a prior RSB or a DSB. Root-authority system may send a RSB containing an override command that allows the SM-enabled IC to skip the command segment causing the error. Additionally, the RSB may contain additional SM commands that replace or correct the faulty command segment. Additionally, in some embodiments, if the erroneous data in the secure memory was written by a DSB from a delegate-authority system, a different delegate-authority system may send a DSB containing an override command that allows the SM-enabled IC to skip the command segment causing the error. Additionally, the DSB may contain additional SM commands that perform the tasks previously handled by the faulty command segment.

5.2 Personalization

Personalization refers to programming of keys (e.g., device-specific) and data (e.g., command segments) into a SM-enabled IC during manufacturing. The personalized secret keys may be used for the key management and audit functionality. One of the first values programmed into an SM-enabled IC may be a product chip ID.

Key information may be stored as keysplits. During initialization, the SM core reconstructs the device keys from, for example, the keysplits, information contained in the netlist, or both. For example, a P1 keysplit may be programmed at wafer test as the first keysplit programmed in the device. A P2 keysplit may be programmed at packaged die test. The P1 and P2 keysplits are combined by the SM core to form a base key. The combining function may be chosen such that knowledge of either the P1 or P2 keysplit (but not both) is insufficient to determine the base key. Additionally, one or more additional keysplits may be stored during device assembly or test and may be used by the SM core to determine additional base key(s). For example, a product manufacturer may wish, as part of its manufacturing processes, to store a key that is not known to IC provider or IC manufacturer. In addition to the personalization data, SM-enabled ICs may be programmed with unique product chip IDs, manufacturing tracing/date information, lot IDs, wafer IDs, product types, device history data, and all manner of other information.

Figure 15:
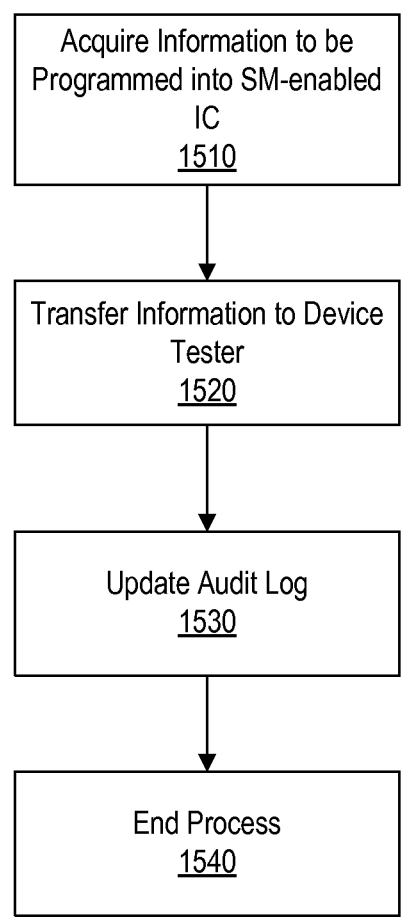
FIG. 15 illustrates in block diagram form, an exemplary personalization process.

FIG. 15 illustrates in block diagram form, an exemplary personalization process. In step 1510, the delegate-authority system acquires information to be programmed into the SM-enabled IC. The information may include for example, one or more base keys, one or more keysplits (e.g., P1, P2, etc.), a product chip ID, or some combination thereof. The information to be programmed may be acquired from a secure storage or a security device (e.g., smartcard or a HSM) coupled to the delegate-authority system.

In step 1520, the delegate-authority system transfers a DSB containing the appropriate memory write commands to a device tester. The information being transferred may be encrypted. The device tester transfers the DSB (with its accompanying RSB) to the SM-enabled ICs, where it is received, verified, and (if valid) executed by the SM core to program the memory.

In step 1530, the delegate-authority system may update an audit log with information indicating that the one or more SM-enabled ICs were successfully personalized, and the process ends (1540). As described previously, these audit logs may then be transferred to a security service 120.

Additionally, any keys input to the SM-enabled IC may be in unencrypted or encrypted form. The SM-enabled IC and/or SM core may support one or more mechanisms of encrypted key transfer for personalization. For example, the SM core may use a previously programmed key (e.g., one or more keys from the root authority, one or more keys from a delegate authority, one or more base keys embedded in the silicon, one or more additional security keys, etc.) to decrypt the data to be programmed. Additionally, the SM core may allow for the exchange or generation of a session key using asymmetric encryption, e.g., to produce a shared key with a delegate-authority system that can use the shared key to encrypt a personalization key prior to transfer to the SM-enabled IC. The session key is used by the SM core to decrypt the key to be programmed. In some embodiments, this protocol may be extended by combining the session key with additional symmetric key values available to the SM core, e.g. to provide mutual authentication between the SM core and an external device (e.g., delegate-authority system) involved in personalization.

Any of the key transfer mechanisms may be chosen independently for each personalization step. Additionally, the SM-enabled IC does not necessarily need to impose any restrictions on the order in which keys are personalized, allowing chips produced from the same original mask set to be personalized in different sequences for different applications or customers.

Even before any personalization is performed, the delegate-authority system may be able to produce DSBs that update the feature status, e.g. for testing. In one embodiment, the SM core generates a random challenge value which is sent to the delegate-authority system. The delegate-authority system generates and sends a DSB that is bound to the challenge value and that performs feature management, key management, or both, as desired on a non-persistent basis. For example, the delegate-authority system may enabled one or more Features of the SM-enabled IC until the next reset. Thus, allowing the operation of the SM-enabled device to be tested. Thus, even if a chip's secure memory is fully corrupted or unprogrammed, secure operations can still be performed.

5.3 In-Field Updates to Feature Status of SM-Enabled Devices

Users of SM-enabled devices may be able to request updates to the feature status. The messages (e.g., RSBs/DSBs) that authorize these changes can be chip-specific or otherwise limited so that they may be safely sent over untrusted channels (such as the Internet). Merchants, system operators, device vendors, and device manufacturers can also request commands to update features in SM-enabled ICs. In some situations the request is transferred independently of method by which the feature update is communicated to the SM-enabled device. For example, it is possible to precompute a series of messages that provide unlock of a certain feature capability, where each message is formulated for a different specific product chip ID. This precomputed list may be stored by a server that is not in direct connection with the root authority system or delegate authority system. As appropriate (such as after a payment is received), entries in the precompute list can be released to SM-enabled devices.

Figure 16:
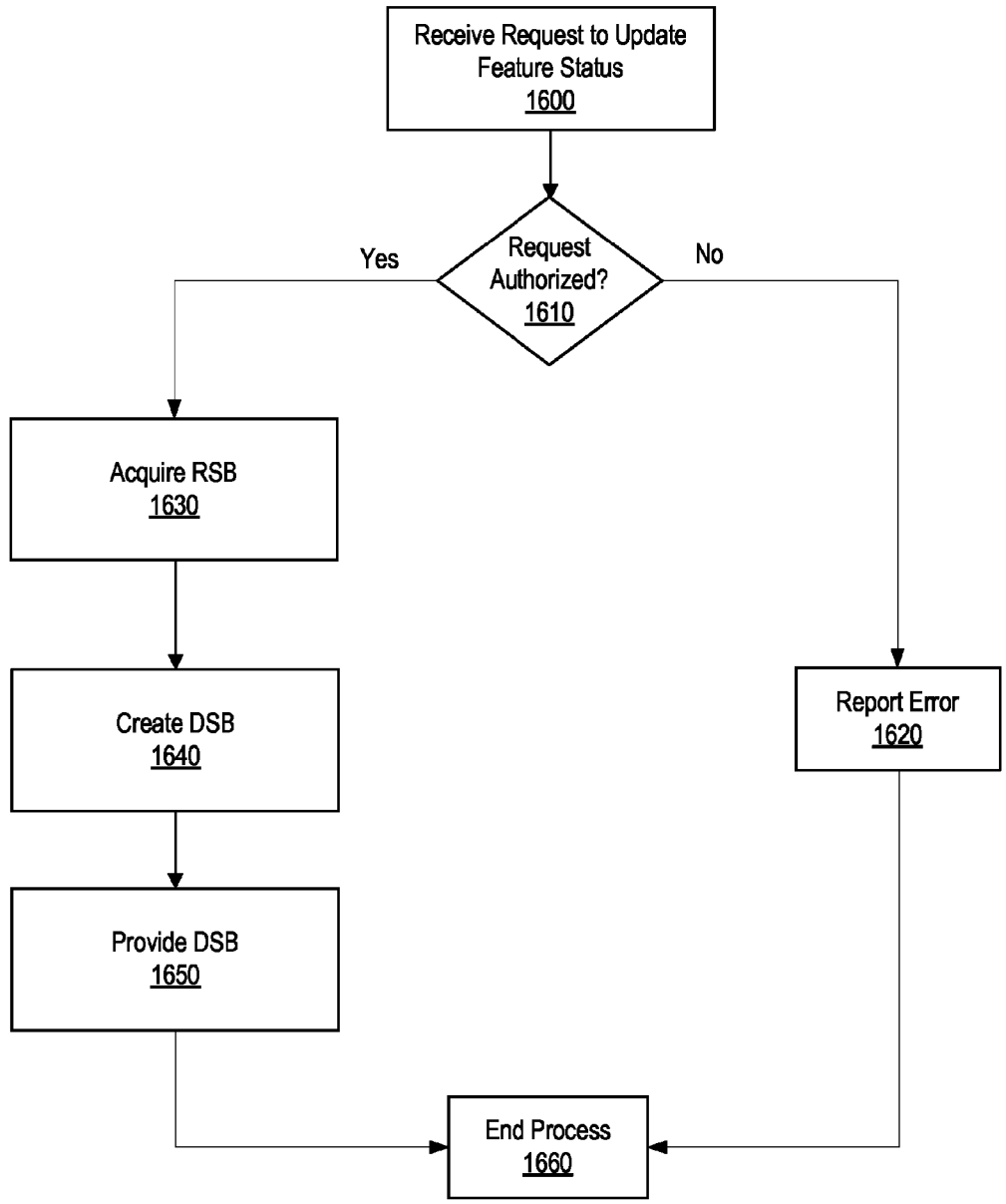
FIG. 16 is a flow chart of an exemplary method for authorization, performed by a delegate-authority system, of a request for a feature update for a Security-Manager-enabled IC.

FIG. 16 is a flow chart of an exemplary method for authorization of request for a feature update for a SM-enabled IC, where the update is authorized by a delegate-authority system (e.g., delegate-authority system 222).

In step 1600, the delegate-authority system receives a request to update feature state associated with a SM-enabled IC. The request may be a message over a network, an email, a command received via a web-portal, a telephone request, an SMS message, etc. Additionally, in some embodiments, the request may be from a subsystem that is subordinate to the delegate-authority system that handles the request. (For example, the subordinate may authenticate the request by confirming a credential in a user database or a payment, then forward approved requests to the main delegate-authority system.)

In step 1610, the delegate-authority system does its determination of whether this request is authorized. For example, the delegate-authority system may contact a third party (e.g., billing and reporting service 122, or security service 120) for information or assistance. If the request is not approved, the delegate-authority system then reports (1620) the authorization failure to the user and the process ends (1660). For example, the delegate-authority system may send an email to the user indicating the authorization failure and the reason for the failure.

If the authorization request is approved, the delegate-authority system acquires (1630) an RSB. The RSB may be retrieved from a root-authority system or security service, or if previously received, the RSB may be retrieved from storage internal to (or otherwise associated with) the delegate-authority system.

The delegate-authority system then creates (1640) a DSB. The DSB may be created, for example, using the process or part of processes described above with reference to FIGS. 8, 9A, 9B, and 11.

The delegate-authority system provides (1650) the DSB and the process ends (1660). For example, the delegate-authority system may transmit the DSB to the User's SM-enabled device via a network (e.g., cellular or Internet). Or, in some embodiments, the delegate-authority system make the DSB available to the user for download (e.g., by posting on a secure website).

Figure 17:
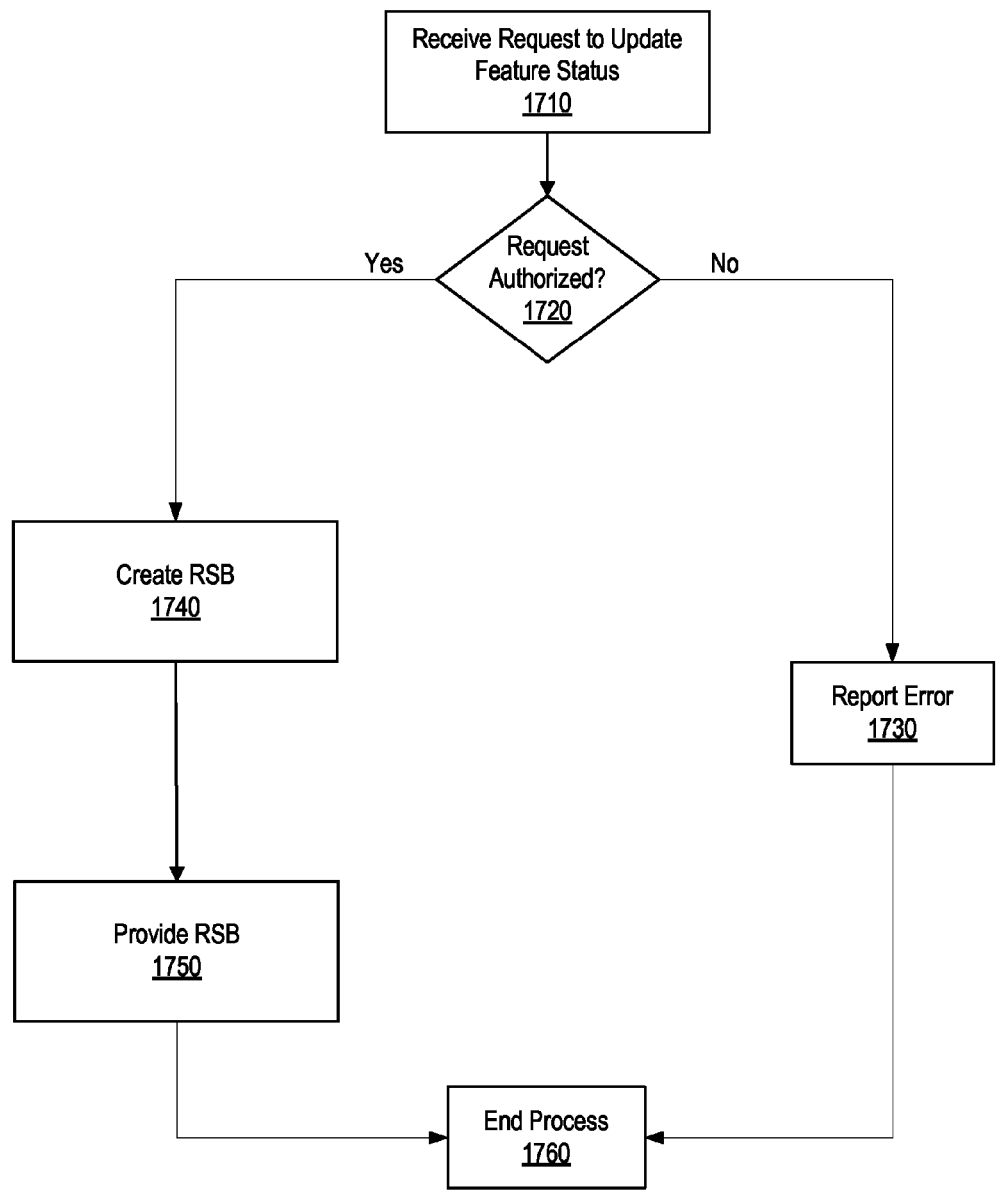
FIG. 17 is a flow chart of an exemplary method for authorization, performed by a root-authority system, of a request for a feature update for a Security-Manager-enabled IC.

FIG. 17 is a flow chart of an exemplary method for authorization of a request for a feature update for a SM-enabled IC, where the update is authorized by a root-authority system (e.g., root-authority system 217).

In step 1710, the root-authority system receives a request to update a feature status associated with a SM-enabled IC. The request may be a message over a network, an email, a command received via a web-portal, a telephone request, an SMS message, etc. Additionally, in some embodiments, the request may be from a subsystem that is subordinate to the delegate-authority system that handles the request. (For example, the subordinate may authenticate the request by confirming a credential in a user database or a payment, then forward approved requests to the main delegate-authority system.) The request may be from a delegate-authority system.

In step 1720, the root-authority system determines whether this request is authorized (which may include contacting a third party for information or assistance). If the request is not approved, the root-authority system then reports (1730) the authorization failure and the process ends (1760)

If the authorization request is approved, the root-authority system then creates (1740) an RSB. In this embodiment, the RSB contains information that directs the SM core to update its feature state. The RSB may be created, for example, using the process described above with reference to FIG. 5 or 7.

The root-authority system then provides (1750) the RSB and the process ends (1760).

Examples of various embodiments of the present disclosure will now be discussed.

According to Example #1, a method may comprise receiving, by a security manager of an integrated circuit, a root signed block; verifying, by the security manager, a signature associated with the root signed block using a secret key; extracting, by the security manager, a command from the root signed block; executing, by the security manager, the extracted command, wherein the executed command pertains to operation of the integrated circuit.

According to Example #2, a method may comprise receiving, by a security manager of an integrated circuit, a delegate signed block; identifying, the security manager, delegate permissions and a key associated with a delegate authority system; verifying, by the security manager, a signature associated with the delegate signed block using the key associated with the delegate authority system; extracting, by the security manager, a command from the delegate signed block; verifying, by the security manager, that the extracted command is permitted using the delegate permissions; and executing, by the security manager, the extracted command, wherein the executed command pertains to operation of the integrated circuit.

According to Example #3, a method may comprise receiving, by a security manager of an integrated circuit, a command to update a state of a feature of a plurality of features of the integrated circuit; determining, by the security manager, whether an update to the state of the feature is persistent; and if the update is persistent, saving the command to memory, and executing the command to update the state of the feature. In one embodiment, the state of the feature is updated according to one or more factors comprising a time related factor, or a characteristic of the integrated circuit, or a characteristic of a device.

According to Example #4, a method may comprise receiving, by a security manager of an integrated circuit, a challenge pertaining to a state of a feature of the integrated circuit, the challenge being received from an auditing system; responsive to the challenge, computing, by the security manager, an audit attestation value as a function of a secret key and the state of the feature; and providing the audit attestation value to the auditing system.

According to Example #5, a method may comprise receiving configurator input data including a configurator input file and hardware constant; and generating integrated circuit design files using the input data, wherein the integrated circuit design files include an extractor hardware definition, one or more sub-extractor hardware definitions, and a state cache.

According to Example #6, a method may comprise receiving configurator operational input data defining policies for features and keys of an integrated circuit; generating an operational configuration map for the integrated circuit using the configurator operational input data; and creating mapping files from the operational configuration map.

According to Example #7, a method may comprise: upon a power-on or reset of an integrated circuit, retrieving, by a security manager of the integrated circuit, an integrity check value; performing, by the security manager, an integrity check by processing command segments in a secure memory; and determining whether any of the command segments has an integrity error based on the integrity check value.

According to Example #8, a method may comprise tracking commands received from entities by a security manager of an integrated circuit; associating the commands with corresponding entities; and billing each of the entities based on commands received from a respective entity.

In the present disclosure a "computer" may include one or more processors, a memory, a data interface, a hardware security module, a display, or some combination thereof. The processor(s) can be a single or multiple microprocessors, field programmable gate arrays (FPGAs), or digital signal processors (DSPs) capable of executing particular sets of instructions. Some of the methods performed by the computer may be implanted using computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor (e.g., ROM or flash) memory. Alternatively, some of the methods can be implemented in hardware components or combinations of hardware and software such as, for example, ASICs, special purpose computers, or general purpose computers. Some embodiments may be implemented not only within an integrated circuit but also within computer-readable media. For example, these designs may be stored upon and/or embedded within computer-readable media associated with a software design tool used for designing integrated circuits. Examples include VHSIC Hardware Description Language (VHDL) netlists, Verilog Register Transfer Level (RTL) netlists, and transistor level (e.g., SPICE or SPICE related files) netlists. Note that such netlists may be synthesized as well as synthesizable. Computer-readable media also includes media having layout information such as a GDS-II file. Furthermore, netlist files or other computer-readable media for integrated circuit design may be used in a simulation environment to perform the methods of the designs described above.

Certain adaptations and modifications of the described embodiments can be made. Therefore, the above discussed embodiments are considered to be illustrative and not restrictive. Embodiments of the present application are not limited to any particular operating system, mobile device architecture, server architecture, or computer programming language.

What is claimed is:

1. A method comprising:
   receiving, by a root authority system, data identifying a command that, when executed by a security manager core of an integrated circuit, enables the security manager core to update a functionality of a hardware feature of the integrated circuit, a command template that designates content, form, or both of a delegate signing block (DSB) for a delegate authority system, and delegate permissions associated with the delegate authority system;
   signing, by the root authority system, the command using a root authority key to create a root signed block (RSB), the RSB comprising a signature signed by the root authority key, a delegate public key associated with the delegate authority system, and the data identifying the command, the command template, and the delegate permissions; and
   providing the RSB to the security manager core of the integrated circuit, wherein the command, in response to the signature of the RSB being verified by the security manager core, is executed by the security manager core to enable the security manager core to update the functionality of the hardware feature.

2. The method of claim 1 wherein the RSB is provided to the security manager core via a tester interface of the integrated circuit.

3. The method of claim 1 wherein the command instructs the security manager core to update a state of the hardware feature of the integrated circuit, wherein the update to the hardware feature is persistent or non-persistent.

4. The method of claim 1 wherein the command is to deliver one or more keys to components of the integrated circuit, wherein the keys pertain to at least one of: encryption operations of the components, digital rights management operations of the components, password management operations of the components, or authentication operations of the components.

5. The method of claim 1 wherein the command is to store one or more hardware constants within the integrated circuit, the hardware constants comprising at least one of: a product chip identifier, one or more security keys, one or more base keys, or error correction data.

6. A method comprising:
   receiving, by a root authority system, input parameters indicating a command that, when executed by a security manager core of an integrated circuit, enables the security manager core to update a functionality of a hardware feature of the integrated circuit;
   creating, by the root authority system, a root signed block (RSB) comprising a signature signed by a root authority key associated with the root authority system, the command, a delegate public key and delegate permissions associated with a delegate authority system, and a command template that designates content, form, or both of a delegate signing block (DSB) to be created by the delegate authority system; and
   providing the RSB to the security manager core of the integrated circuit, wherein the command, in response to the signature of the RSB being verified by the security manager core and a signature of the DSB being verified by the security manager core using the delegate public key provided in the RSB, is executed by the security manager core to enable the security manager core to update the functionality of the hardware feature.

7. The method of claim 6 wherein the delegate permissions define management capabilities of the delegate authority system over the security manager core.

8. The method of claim 6 wherein the RSB further comprises a command template associated with the command.

9. The method of claim 6 wherein the RSB further comprises one or more requirements for a delegate authority signature.

10. The method of claim 6 further comprising delivering the RSB to the delegate authority system.

11. A method comprising:
    receiving, by a delegate authority system, input parameters including a command that, when executed by a security manager core of an integrated circuit, enables the security manager core to update a functionality of a hardware feature of the integrated circuit, and a command template that designates content, form, or both of a delegate signing block (DSB) to be created by the delegate authority system, wherein the input parameters are received as part of a root signed block (RSB) signed by a root private key associated with a root authority system, the RSB comprising a signature of the command template;

verifying, by the delegate authority system, the signature of the command template with a root public key associated with the root authority system;

signing, by the delegate authority system, the input parameters to create a delegate signed block (DSB) in response to the signature of the command template being verified, the DSB comprising a signature signed by a delegate private key associated with the delegate authority system, and the command; and providing the DSB to the security manager core of the integrated circuit, wherein the command, in response to the signature of the DSB being verified by the security manager core, is executed by the security manager core to enable the security manager core to update the functionality of the hardware feature.

12. The method of claim 11 wherein the input parameters are received as part of a root signed block (RSB) provided by a root authority system.

13. The method of claim 12 wherein the DSB is associated with the RSB, the RSB being provided to the security manager core.

14. The method of claim 12 wherein the RSB comprises one or more of: delegate permissions associated with the delegate authority system, a public key associated with the delegate authority system, a command template associated with the command, or requirements for a delegate authority signature.

15. The method of claim 14 wherein the delegate permissions define management capabilities of the delegate authority system over the security manager core.

* * * * *